US012547263B2

(12) United States Patent
Park et al.

(10) Patent No.: US 12,547,263 B2
(45) Date of Patent: Feb. 10, 2026

(54) FLEXIBLE DISPLAY DEVICE WITH RESISTANCE SENSING LINES OVERLAPPING DRIVING AND SENSING ELECTRODES

(71) Applicant: Samsung Display Co., LTD., Yongin-si (KR)

(72) Inventors: Jung Mok Park, Yongin-si (KR); Bong Il Kang, Yongin-si (KR); Min Hong Kim, Yongin-si (KR); Ye Rin Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/776,082

(22) Filed: Jul. 17, 2024

(65) Prior Publication Data

US 2025/0199634 A1  Jun. 19, 2025

(30) Foreign Application Priority Data

Dec. 13, 2023  (KR) .......................... 10-2023-0180963

(51) Int. Cl.
*G06F 3/041* (2006.01)
*G06F 3/044* (2006.01)

(52) U.S. Cl.
CPC .......... *G06F 3/0412* (2013.01); *G06F 3/0416* (2013.01); *G06F 3/0446* (2019.05); *G06F 2203/04102* (2013.01); *G06F 2203/04111* (2013.01)

(58) Field of Classification Search
CPC .... G06F 3/0412; G06F 3/0416; G06F 3/0446; G06F 2203/04102; G06F 2203/04111
See application file for complete search history.

(56) References Cited

U.S. PATENT DOCUMENTS

| 2015/0220119 A1* | 8/2015 | Seo .......................... G09G 5/37 345/173 |
| 2017/0097721 A1* | 4/2017 | Wang .................... G06F 3/0446 |
| 2022/0236832 A1* | 7/2022 | Watazu ................. G06F 3/0446 |

(Continued)

FOREIGN PATENT DOCUMENTS

| CN | 113778266 A | 12/2021 |
| KR | 2014-0059274 A | 5/2014 |

(Continued)

*Primary Examiner* — Liliana Cerullo
(74) *Attorney, Agent, or Firm* — Womble Bond Dickinson (US) LLP

(57) ABSTRACT

A display device includes: a first display area; a second display area on one side of the first display area; a display unit in the first and second display areas and including a light emitting element configured to emit light; a plurality of driving electrodes on the display unit and electrically connected in a first direction; a plurality of sensing electrodes on a same layer as the driving electrodes and extending in a second direction intersecting the first direction; a first resistance sensing line extending in the second direction and overlapping at least some of the driving electrodes; and a second resistance sensing line on a same layer as the first resistance sensing line, extending in the first direction, and overlapping at least some of the sensing electrodes.

6 Claims, 18 Drawing Sheets

(56) References Cited

U.S. PATENT DOCUMENTS

2023/0092521 A1\*  3/2023  Li ........................ G06F 3/0412
                                                         345/173
2024/0256072 A1\*  8/2024  Heo .................... G09G 3/3233
2024/0370109 A1\* 11/2024  Zhang .................. G06F 3/041

FOREIGN PATENT DOCUMENTS

| KR | 2022-0064863   | 5/2022 |
| KR | 2022-0077834 A | 6/2022 |

\* cited by examiner

FLEXIBLE DISPLAY DEVICE WITH RESISTANCE SENSING LINES OVERLAPPING DRIVING AND SENSING ELECTRODES

CROSS-REFERENCE TO RELATED APPLICATION

The present application claims priority to and the benefit of Korean Patent Application No. 10-2023-0180963, filed on Dec. 13, 2023, in the Korean Intellectual Property Office, the entire disclosure of which is incorporated herein by reference.

BACKGROUND

1. Technical Field

Aspects of some embodiments of the present disclosure relate to a display device.

2. Description of the Related Art

As an information society develops, consumer demand for display devices for displaying images is increasing in various forms. For example, display devices may be applied to various electronic devices such as smartphones, digital cameras, laptop computers, navigation devices, and smart televisions. A display device may be a flat panel display device such as a liquid crystal display device, a field emission display device, or an organic light emitting display device. Among flat panel display devices, the light emitting display device may include a light emitting element in which each of the pixels of a display panel may emit light by itself, thereby displaying images without a backlight unit providing the light to the display panel.

Because the light emitting display may be bent or folded when including a flexible substrate, the light emitting display device may operate as a flexible display device such as a foldable display device and a slideable display device.

The above information disclosed in this Background section is only for enhancement of understanding of the background and therefore the information discussed in this Background section does not necessarily constitute prior art.

SUMMARY

Aspects of some embodiments of the present disclosure include a display device capable of sensing an area in a display panel where bending, folding, or rolling has occurred without including a separate sensor, switch, or metal layer.

However, aspects of embodiments of the present disclosure are not restricted to those set forth herein. The above and other aspects of embodiments of the present disclosure will become more apparent to one of ordinary skill in the art to which the present disclosure pertains by referencing the detailed description of the present disclosure given below.

According to some embodiments, a display device comprises a first display area, a second display area on one side of the first display area, a display unit in the first and second display areas and including a light emitting element that emits light, a plurality of driving electrodes on the display unit and electrically connected in a first direction, a plurality of sensing electrodes on the same layer as the driving electrodes and extending in a second direction intersecting the first direction, a first resistance sensing line extending in the second direction and overlapping at least some of the driving electrodes, and a second resistance sensing line on the same layer as the first resistance sensing line, extending in the first direction, and overlapping at least some of the sensing electrodes.

According to some embodiments, the display device may further comprise a touch driver that senses an area where bending, folding, or rolling of the second display area occurs by comparing resistance change rates of the first and second resistance sensing lines.

According to some embodiments, the second resistance sensing line may comprise a line connection portion overlapping the first resistance sensing line and on the same layer as the driving electrodes and the sensing electrodes.

According to some embodiments, the first resistance sensing line may comprise a resistance sensing pattern that is bent multiple times in an area overlapping the driving electrode, and the second resistance sensing line may comprise a resistance sensing pattern that is bent multiple times in an area overlapping the sensing electrode.

According to some embodiments, the driving electrodes and the sensing electrodes may be on the first and second resistance sensing lines.

According to some embodiments, the display device may further comprise a bridge electrode electrically connecting the driving electrodes adjacent to each other in the first direction. The bridge electrode and the first and second resistance sensing lines may be on the same layer.

According to some embodiments, a display device comprises a display unit including a light emitting element that emits light, a plurality of driving electrodes on the display unit and electrically connected in a first direction, a plurality of sensing electrodes on the same layer as the driving electrodes and electrically connected in a second direction intersecting the first direction, a first resistance sensing line on the same layer as the driving electrodes and extending in the second direction between the driving electrodes spaced apart in the first direction, and a second resistance sensing line on the same layer as the first resistance sensing line and extending in the first direction between the sensing electrodes spaced apart in the second direction.

According to some embodiments, the plurality of driving electrodes may comprise a first electrode connection portion overlapping the first resistance sensing line and electrically connecting the driving electrodes spaced apart in the first direction, and the plurality of sensing electrodes may comprise a second electrode connection portion overlapping the second resistance sensing line and electrically connecting the sensing electrodes spaced apart in the second direction.

According to some embodiments, the driving electrodes, the sensing electrodes, and the first and second resistance sensing lines may be on the first and second electrode connection portions.

According to some embodiments, the second resistance sensing line may comprise a line connection portion overlapping the first resistance sensing line and on the same layer as the first and second electrode connection portions.

According to some embodiments, the first resistance sensing line may comprise a resistance sensing pattern that is bent multiple times in an area overlapping the first electrode connection portion, and the second resistance sensing line may comprises a resistance sensing pattern that is bent multiple times in an area overlapping the second electrode connection portion.

According to some embodiments, a display device comprises a display unit including a light emitting element that emits light, a plurality of driving electrodes on the display unit and electrically connected in a first direction, a plurality of sensing electrodes on the same layer as the driving electrodes and extending in a second direction intersecting the first direction, a first resistance sensing line extending in the second direction and overlapping at least some of the driving electrodes, and a second resistance sensing line on the same layer as the first resistance sensing line, extending in the first direction, and overlapping at least some of the driving electrodes.

According to some embodiments, the first resistance sensing line may comprise a resistance sensing pattern that is bent multiple times in an area overlapping the driving electrode, and the second resistance sensing line may comprises a resistance sensing pattern that is bent multiple times in an area overlapping the resistance sensing pattern of the first resistance sensing line.

According to some embodiments, the second resistance sensing line may comprise a line connection portion overlapping the resistance sensing pattern of the first resistance sensing line and below the first resistance sensing line.

According to some embodiments, the driving electrodes and the sensing electrodes may be on the first and second resistance sensing lines.

According to some embodiments, other portions of the first and second resistance sensing lines may overlap at least some of the sensing electrodes.

According to some embodiments, a display device includes a display unit including a light emitting element that emits light, a plurality of driving electrodes on the display unit and electrically connected in a first direction, a plurality of sensing electrodes on the same layer as the driving electrodes and electrically connected in a second direction intersecting the first direction, a first resistance sensing line on the same layer as the driving electrodes and extending in the second direction between the driving electrodes spaced apart in the first direction, and a second resistance sensing line on a different layer from the driving electrodes and the first resistance sensing line and extending in the first direction.

According to some embodiments, the plurality of driving electrodes may comprise a first electrode connection portion overlapping the first resistance sensing line and electrically connecting the driving electrodes spaced apart in the first direction.

According to some embodiments, the driving electrodes, the sensing electrodes, and the first resistance sensing line may be on the second resistance sensing line and the first electrode connection portion.

According to some embodiments, the first resistance sensing line may comprise a resistance sensing pattern that is bent multiple times in an area overlapping the first electrode connection portion, and the second resistance sensing line may comprise a resistance sensing pattern that is bent multiple times in an area overlapping the resistance sensing pattern of the first resistance sensing line.

In a display device according to some embodiments, a touch sensing unit may include first and second resistance sensing lines extending in different directions, and a touch driver may sense an area in the display panel where bending, folding, or rolling has occurred by comparing resistance change rates of the first and second resistance sensing lines. Therefore, the display device may sense the area in the display panel where bending, folding, or rolling has occurred without including a separate sensor, switch, or metal layer.

However, the characteristics of embodiments according to the present disclosure are not restricted to those set forth herein. The above and other characteristics of the embodiments will become more apparent to one of ordinary skill in the art to which the embodiments pertain by referencing the claims.

BRIEF DESCRIPTION OF THE DRAWINGS

The above and other aspects and features of embodiments according to the present disclosure will become more apparent by describing in more detail aspects of some embodiments thereof with reference to the attached drawings, in which.

DETAILED DESCRIPTION

Figure 1:
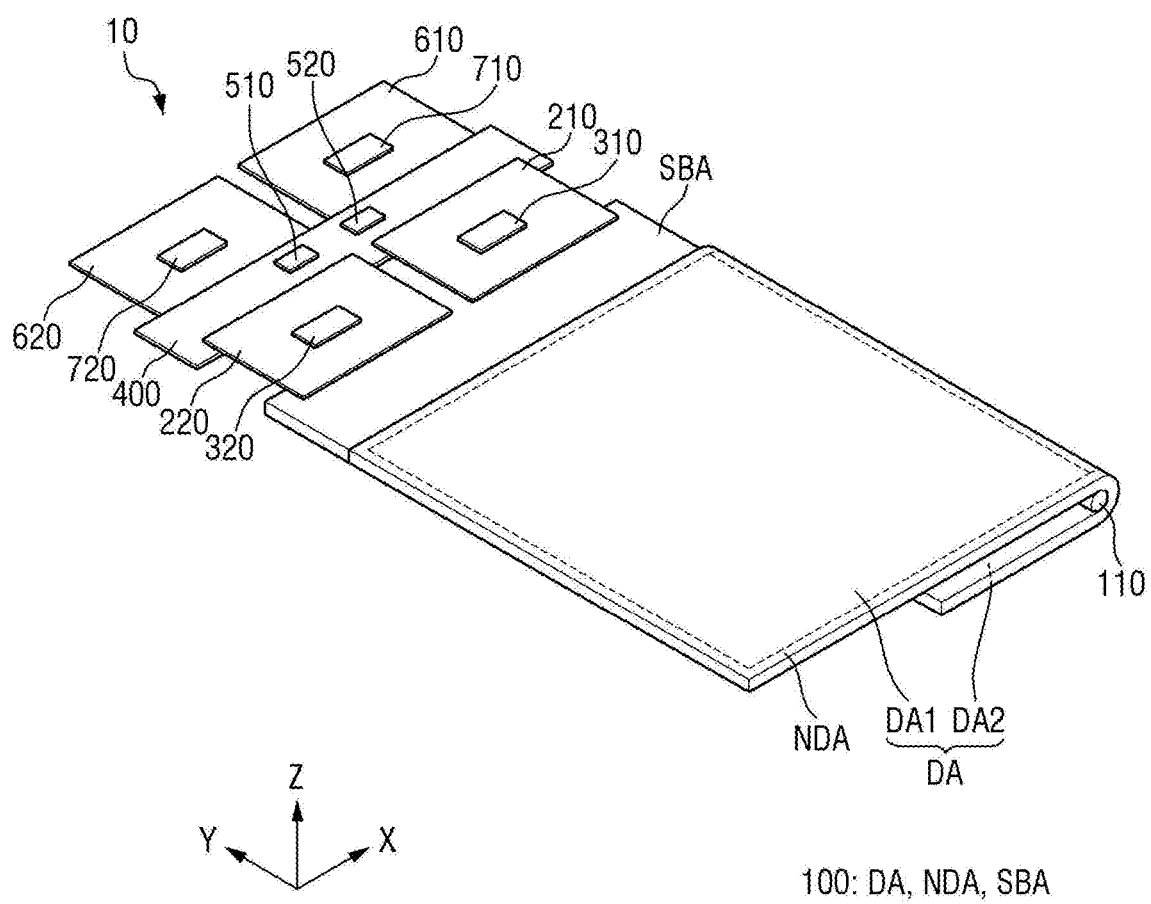
FIG. 1 is a perspective view illustrating a first state of a display device according to some embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z", "at least one of X, Y, or Z", and "at least one selected from the group consisting of X, Y, and Z" may be construed as X only, Y only, Z only, or any combination of two or more of X, Y, and Z, such as, for instance, XYZ, XYY, YZ, ZZ, or the like. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, aspects of some embodiments of the present disclosure are described in more detail with reference to the accompanying drawings.

Figure 2:
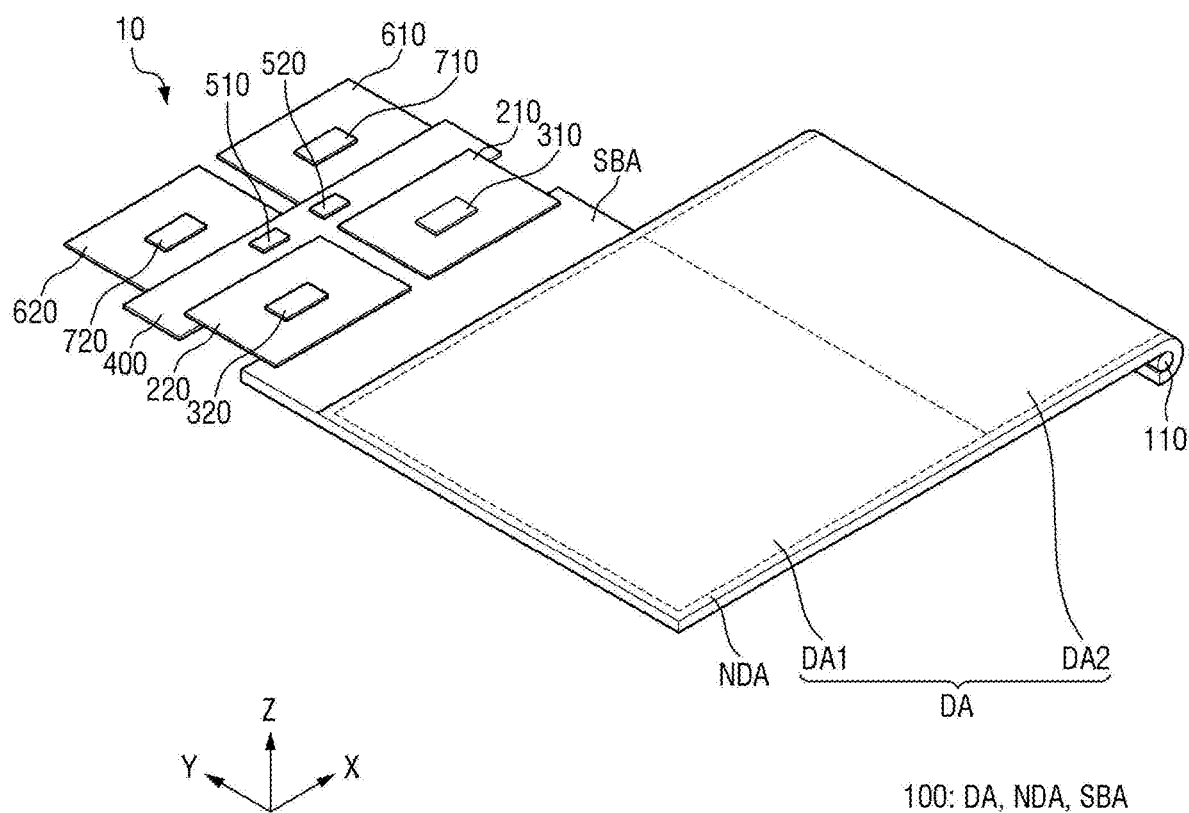
FIG. 2 is a perspective view illustrating a second state of the display device according to some embodiments.
Figure 3:
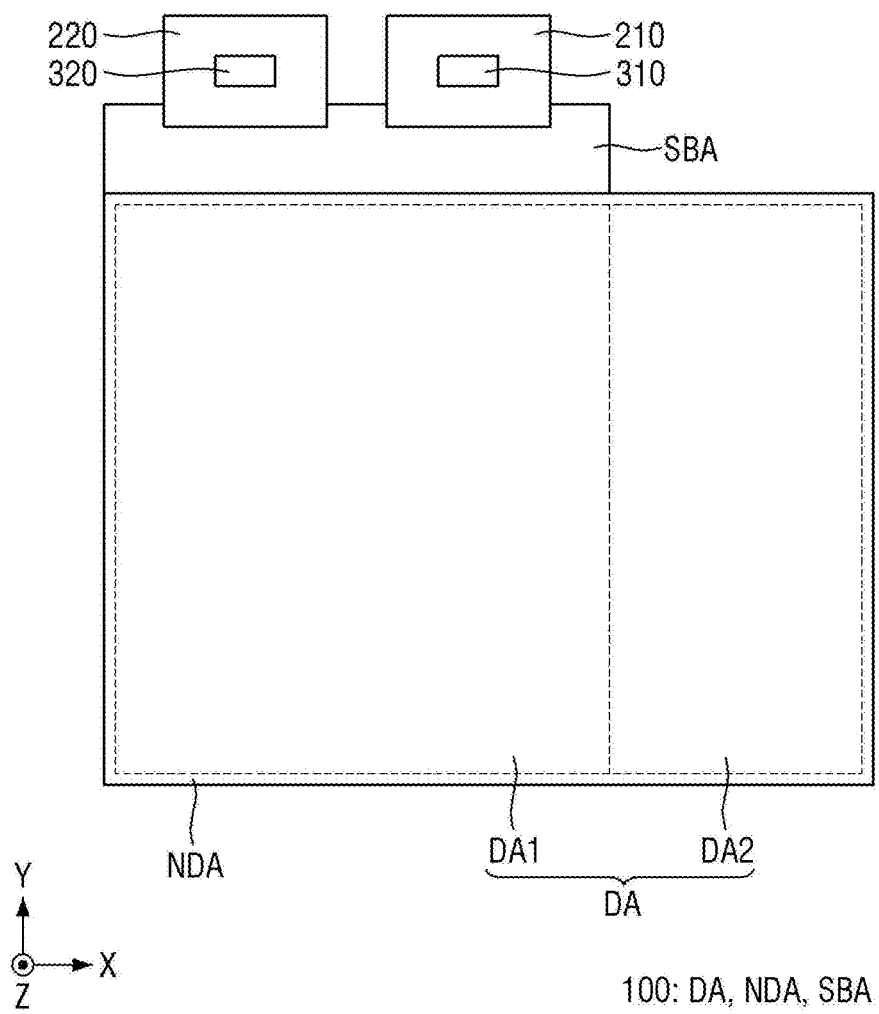
FIG. 3 is a plan view illustrating a display device according to some embodiments.

FIG. 1 is a perspective view illustrating a first state of a display device according to some embodiments, FIG. 2 is a perspective view illustrating a second state of the display device according to some embodiments, and FIG. 3 is a plan view illustrating a display device according to some embodiments.

Referring to FIGS. 1 to 3, a display device 10 may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied to a display unit of a television, a laptop computer, a monitor, a billboard, or the Internet of Things (IoT). As another example, the display device 10 may be applied to a wearable device such as a smart watch, a watch phone, a glasses-type display, and a head mounted display (HMD).

The display device 10 may include a display panel 100, a first source circuit board 210, a second source circuit board 220, a first display driver 310, a second display driver 320, a control circuit board 400, a timing control circuit 510, a touch driver 520, a first circuit board 610, a second circuit board 620, a first integrated circuit 710, and a second integrated circuit 720.

The display panel 100 may be flexible to be folded, curved, or bent by a roller 110. The display panel 100 may include a display area DA, a non-display area NDA, and a sub-area SBA.

The display area DA may include a plurality of pixels configured to display images. Each of the plurality of pixels may emit light from a light emitting area or an opening area. For example, the display area DA may include a pixel circuit including switching elements, a pixel defining film defining the light emitting areas, and a self-light emitting element.

For example, the self-light emitting element may include at least one of an organic light emitting diode (LED) including an organic light emitting layer, a quantum dot LED including a quantum dot light emitting layer, an inorganic LED including an inorganic semiconductor, or a micro or nano LED, but embodiments according to the present disclosure are not limited thereto.

The display area DA may include a first display area DA1 and a second display area DA2.

The first display area DA1 may be a main display unit of the display panel 100. The first display area DA1 may be constantly driven in the first and second states of the display device 10. The first display area DA1 may be a flat area that is not folded, curved, or bent. The first display area DA1 may have a quadrangular planar shape, but is not limited thereto.

The second display area DA2 may be arranged at the right of the first display area DA1. The second display area DA2 may extend from the first display area DA1 in an X-axis direction in the second state of the display device 10. The second display area DA2 may be an auxiliary display unit of the display panel 100. The second display area DA2 may not be driven in the first state of the display device 10 and may be driven in the second state of the display device 10. In the second state of the display device 10, the second display area DA2 may be arranged on the same plane as the first display area DA1 and may display one image with the first display area DA1. The second display area DA2 may be folded, curved, or bent along the roller 110.

The sub-area SBA may be located on an upper side of the first display area DA1. The sub-area SBA may extend from the first display area DA1 in a Y-axis direction. The sub-area SBA may be an area that is folded, curved, or bent. When the sub-area SBA is bent, the sub-area SBA may overlap the first display area DA1 in a Z-axis direction. The sub-area SBA may have a quadrangular planar shape, but embodiments according to the present disclosure are not limited thereto.

The first source circuit board 210 and the second source circuit board 220 may be located at an upper edge of the sub-area SBA. Each of the first and second source circuit boards 210 and 220 may be attached to a pad portion located at the upper edge of the sub-area SBA using an anisotropic conductive film (ACF). Therefore, each of the first and second source circuit boards 210 and 220 may be electrically connected to the pad portion of the display panel 100. The first and second source circuit boards 210 and 220 may be flexible films such as a flexible printed circuit board, a printed circuit board, or a chip on film.

The first display driver 310 and the second display driver 320 may supply data voltages to data lines of the display panel 100. For example, the first display driver 310 may be electrically connected to the data line of the display panel 100 through the first source circuit board 210 and the pad portion of the sub-area SBA. The second display driver 320 may be electrically connected to the data line of the display panel 100 through the second source circuit board 220 and the pad portion of the sub-area SBA. Each of the first and second display drivers 310 and 320 may be formed as an integrated circuit (IC). The first display driver 310 may be attached to one surface of the first source circuit board 210 using a chip on film (COF) method. The second display driver 320 may be attached to one surface of the second source circuit board 220 using a COF method.

The control circuit board 400 may be electrically connected to the first and second source circuit boards 210 and 220. The control circuit board 400 may be attached to the first and second source circuit boards 210 and 220 using an anisotropic conductive film. The control circuit board 400 may be a printed circuit board.

The timing control circuit 510 may be attached to one surface of the control circuit board 400. The timing control circuit 510 may be formed as an integrated circuit. The timing control circuit 510 may control driving timings of the first and second display drivers 310 and 320 by transmitting digital video data to the first and second display drivers 310 and 320. For example, the timing control circuit 510 may transmit first digital video data and a first timing control signal to the first display driver 310, and may transmit second digital video data and a second timing control signal to the second display driver 320. The timing control circuit 510 may be electrically connected to the data line and power line of the display panel 100 through the first or second source circuit board 210 or 220 and the pad portion of the sub-area SBA.

The touch driver 520 may be attached to one surface of the control circuit board 400. The touch driver 520 may be formed as an integrated circuit. The touch driver 520 may be electrically connected to touch electrodes through the control circuit board 400, the first source circuit board 210, the second source circuit board 220, and touch lines of the display panel 100. The touch driver 520 may supply a touch driving signal to the touch electrodes and sense a change in capacitance between the touch electrodes. The touch driver 520 may determine whether or not the user is touching or approaching based on the amount of change in capacitance between the touch electrodes. The user's touch means that an object such as the user's finger or a pen (or a stylus) is in direct contact with one surface of the display panel 100. The user or object approaching means that an object such as the user's finger or pen is hovering away from one surface of the display panel 100.

The first circuit board 610 and the second circuit board 620 may be electrically connected to the control circuit board 400. Each of the first and second circuit boards 610 and 620 may be attached to the control circuit board 400 using an anisotropic conductive film. Each of the first and second circuit boards 610 and 620 may be a flexible film such as a flexible printed circuit board, a printed circuit board, or a chip-on film.

The first integrated circuit 710 may be attached to one surface of the first circuit board 610 using a COF method. The second integrated circuit 720 may be attached to one surface of the second circuit board 620 using a COF method. Each of the first and second integrated circuits 710 and 720 may be electrically connected to the timing control circuit 510. The first and second integrated circuits 710 and 720 may transmit digital video data to the timing control circuit 510.

The roller 110 may extend in the Y-axis direction. The roller 110 may move in the X-axis direction. The roller 110 may have a rotation axis in the Y-axis direction and may rotate in a first rotation direction or a second rotation direction. For example, the first rotation direction may be a clockwise direction, and the second rotation direction may be a counterclockwise direction. Accordingly, the roller 110 may move in the X-axis direction while rotating in the first or second rotation direction.

When the roller 110 moves to the right and rotates in the second rotation direction, the second display area DA2 may be gradually exposed to the front. As the roller 110 moves to the right, an area of the second display area DA2 which is visible from the front of the display device 10 may increase.

When the roller 110 moves to the left and rotates in the first rotation direction, the second display area DA2 may gradually face the rear. As the roller 110 moves to the left, an area of the second display area DA2 which is visible from the front of the display device 10 may decrease.

As the second display area DA2 slides according to the movement of the roller 110, a size of the display panel 100 which is visible from the front of the display device 10, that is, a size of the display area DA where an image is displayed, may be adjusted. Therefore, the user may select the size of the display panel 100 by adjusting a state of the display device 10 to a first state or a second state according to a use of the display device 10.

Figure 4:
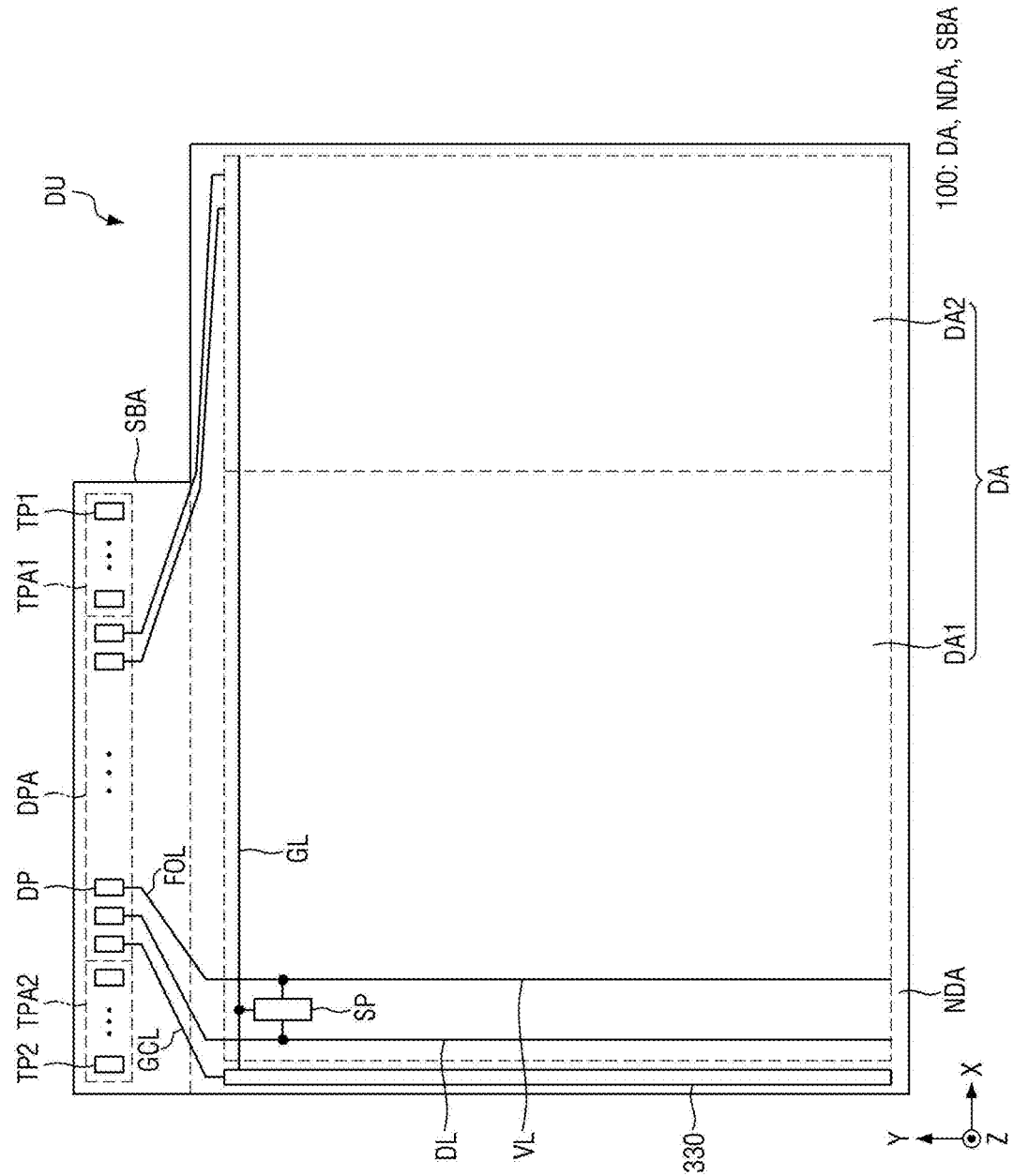
FIG. 4 is a plan view illustrating a display unit of the display device according to some embodiments.

FIG. 4 is a plan view illustrating a display unit of the display device according to some embodiments.

Referring to FIG. 4, the display unit DU may include a display area DA and a non-display area NDA.

The display area DA, which is an area configured to display images, may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit for outputting light.

The plurality of gate lines GL may supply a gate signal received from a gate driver 330 to the plurality of pixels SP. The plurality of gate lines GL may extend in the X-axis direction and may be spaced apart from each other in the Y-axis direction intersecting the X-axis direction.

The plurality of data lines DL may supply the data voltages received from the first and second display drivers 310 and 320 to the plurality of pixels SP. The plurality of data lines DL may extend in the Y-axis direction and may be spaced apart from each other in the X-axis direction.

The plurality of power lines VL may supply power voltages received from the first and second display drivers 310 and 320 to the plurality of pixels SP. Here, the power voltage may be at least one of a driving voltage, an initialization voltage, a reference voltage, or a low potential voltage. The plurality of power lines VL may extend in the Y-axis direction and may be spaced apart from each other in the X-axis direction.

The non-display area NDA may surround (e.g., in a periphery or outside a footprint of) the display area DA. The non-display area NDA may include a gate driver 330, fan-out lines FOL, and gate control lines GCL. The gate driver 330 may generate a plurality of gate signals based on the gate control signal, and may sequentially supply the plurality of gate signals to the plurality of gate lines GL according to a set order.

The fan-out lines FOL may extend from the display pad portion DP to the display area DA. The fan-out lines FOL may supply the data voltage received from the display pad portion DP to the plurality of data lines DL, and may supply the power voltage received from the display pad portion DP to the plurality of power lines VL.

The gate control line GCL may extend from the display pad portion DP to the gate driver 330. The gate control line GCL may supply the gate control signal received from the display pad portion DP to the gate driver 330.

The sub-area SBA may include a display pad area DPA and first and second touch pad areas TPA1 and TPA2. The display pad area DPA, the first touch pad area TPA1, and the second touch pad area TPA2 may be located at an edge of the sub-area SBA. The display pad area DPA, the first touch pad area TPA1, and the second touch pad area TPA2 may be electrically connected to the first and second source circuit boards 210 and 220 using a low-resistance, high-reliability material such as an anisotropic conductive film or self assembly anisotropic conductive paste (SAP).

The display pad area DPA may include a plurality of display pad portions DP. The plurality of display pad portions DP may be electrically connected to the first and second display drivers 310 and 320 through the first and second source circuit boards 210 and 220. The plurality of display pad portions DP may be connected to the first and second display drivers 310 and 320 to receive the data voltage and the power voltage.

Figure 5:
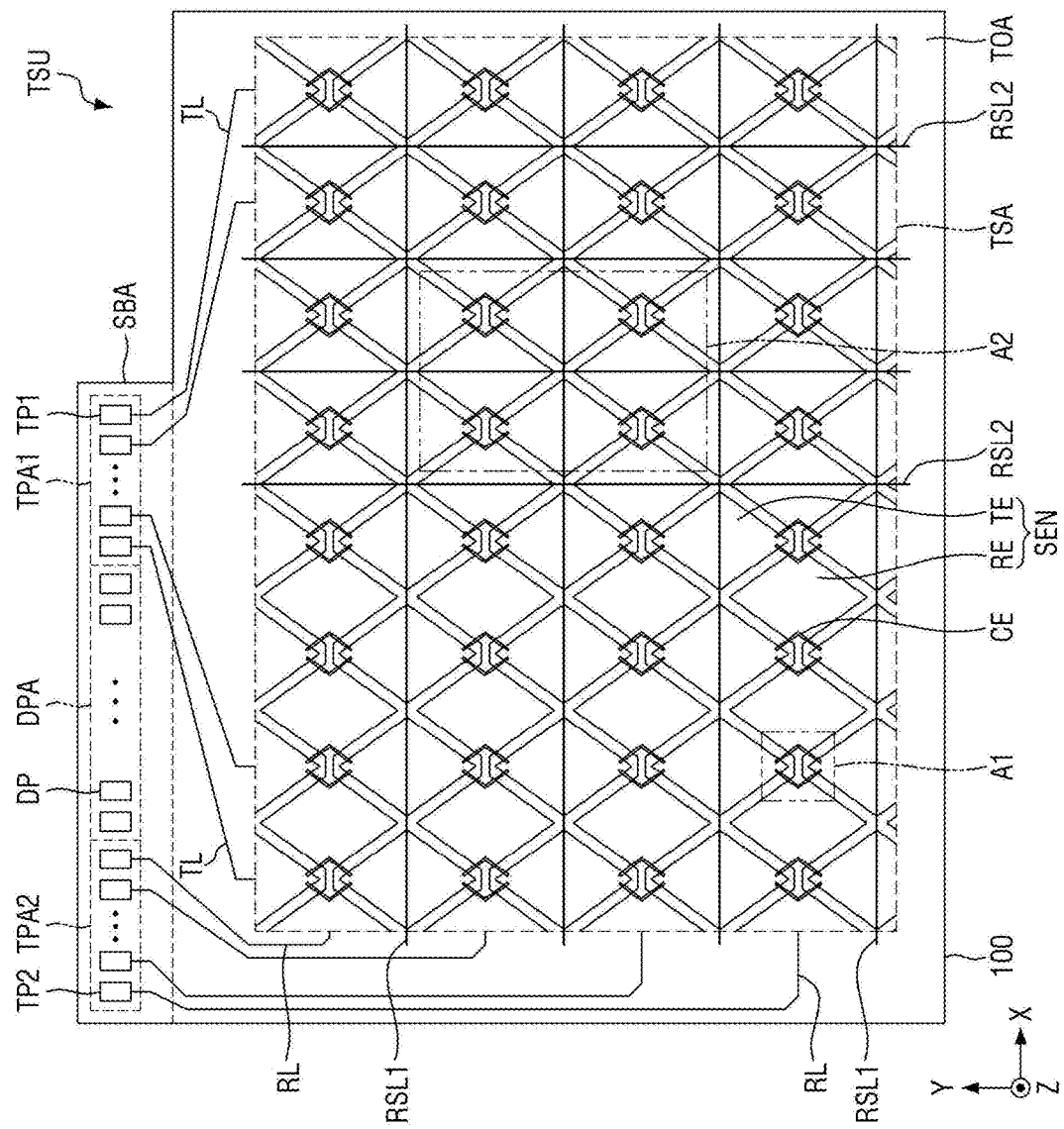
FIG. 5 is a plan view illustrating a touch sensing unit of the display device according to some embodiments.
Figure 6:
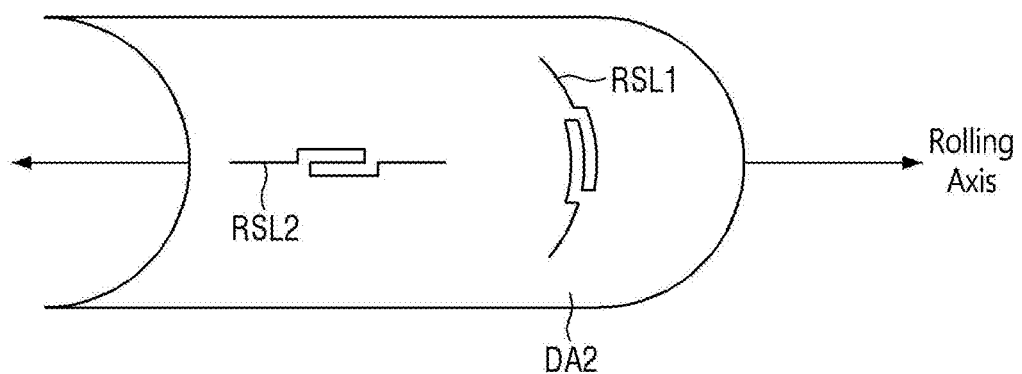
FIG. 6 is a view illustrating bending of first and second resistance sensing lines according to rolling of the display device according to some embodiments.

FIG. 5 is a plan view illustrating a touch sensing unit of the display device according to some embodiments and FIG. 6 is a view illustrating bending of first and second resistance sensing lines according to rolling of the display device according to some embodiments.

Referring to FIGS. 5 and 6, the touch sensing unit TSU may include a touch sensor area TSA for sensing a user's touch, and a touch peripheral area TOA arranged around the touch sensor area TSA. The touch sensor area TSA may overlap the display area DA of the display unit DU, and the touch peripheral area TOA may overlap the non-display area NDA of the display unit DU.

The touch sensor area TSA may include a plurality of touch electrodes SEN. The plurality of touch electrodes SEN may form mutual capacitance or self capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through bridge electrodes CE.

The plurality of driving electrodes TE may be connected to a first touch pad portion TP1 through a driving line TL. For example, the driving electrodes TE located on an upper side of the touch sensor area TSA may be electrically connected to the first touch pad portion TP1 through the driving line TL. The driving line TL may extend to the first touch pad portion TP1 via an upper side of the touch peripheral area TOA and the first touch pad portion TP1. The first touch pad portion TP1 may be electrically connected to the touch driver 520 through the first and second source circuit boards 210 and 220 and the control circuit board 400.

The bridge electrode CE may be bent at least once. For example, the bridge electrode CE may have a clamp shape ("<" or ">"), but a planar shape of the bridge electrode CE is not limited thereto. The driving electrodes TE adjacent to each other in the Y-axis direction may be electrically connected to each other by a plurality of bridge electrodes CE, and even if any one of the bridge electrodes CE is disconnected, the driving electrodes TE may be stably connected to each other through the remaining bridge electrodes CE. The driving electrodes TE adjacent to each other may be connected to each other by two bridge electrodes CE, but the number of bridge electrodes CE is not limited thereto.

The bridge electrodes CE may be located on a layer different from that of the driving electrodes TE and the sensing electrodes RE. The sensing electrodes RE adjacent to each other in the X-axis direction may be electrically connected to each other through a connection portion located on the same layer as the driving electrodes TE or the sensing electrodes RE, and the driving electrodes TE adjacent to each other in the Y-axis direction may be electrically connected to each other through the bridge electrode CE located on a different layer from the driving electrodes TE or the sensing electrodes RE. Therefore, even if the bridge electrodes CE overlap the sensing electrodes RE in the Z-axis direction, the driving electrodes TE and the sensing electrodes RE may be insulated from each other. Mutual capacitance may be formed between the driving electrode TE and the sensing electrode RE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portion.

The plurality of sensing electrodes RE may be electrically connected to the second touch pad portion TP2 through a sensing line RL. For example, the sensing electrodes RE located on the left side of the touch sensor area TSA may be electrically connected to the second touch pad portion TP2 through the sensing line RL. The sensing line RL may extend to the second touch pad portion TP2 via the sub-area SBA and the left and upper sides of the touch peripheral area TOA. The second touch pad portion TP2 may be electrically connected to the touch driver 520 through the first and second source circuit boards 210 and 220 and the control circuit board 400.

The first touch pad area TPA1 may be located on one side of the display pad area DPA and may include a plurality of first touch pad portions TP1. The first touch pad portions TP1 may be electrically connected to the touch driver 520 located on the control circuit board 400. The first touch pad portions TP1 may supply a touch driving signal to the driving electrodes TE through the driving lines TL.

The second touch pad area TPA2 may be located on the other side of the display pad area DPA and may include a plurality of second touch pad portions TP2. The second touch pad portions TP2 may be electrically connected to the touch driver 520 located on the control circuit board 400. The touch driver 520 may receive a touch sensing signal through the sensing lines RL connected to the second touch pad portions TP2, and may sense a change in mutual capacitance between the driving electrode TE and the sensing electrode RE.

As another example, the touch driver 520 may supply a touch driving signal to each of the driving electrodes TE and the sensing electrodes RE, and may receive a touch sensing signal from each of the driving electrodes TE and the sensing electrodes RE. The touch driver 520 may sense an amount of change in charge of each of the driving electrodes TE and the sensing electrodes RE based on the touch sensing signal.

A plurality of first resistance sensing lines RSL1 may extend in the X-axis direction and be spaced apart from each other in the Y-axis direction. The first resistance sensing line RSL1 may be located in the first and second display areas DA1 and DA2. The first resistance sensing line RSL1 may extend from the left side to the right side of the touch sensor area TSA. For example, the first resistance sensing line RSL1 may be located on a different layer from the driving electrodes TE and overlap the driving electrodes TE. As another example, the first resistance sensing line RSL1 may be located on the same layer as the driving electrodes TE and may pass between the driving electrodes TE adjacent to each other in the Y-axis direction. The first resistance sensing line RSL1 may be electrically connected to the second touch pad portion TP2 through the sensing line RL or a separate signal line.

A plurality of second resistance sensing lines RSL2 may extend in the Y-axis direction and be spaced apart from each other in the X-axis direction. The second resistance sensing line RSL2 may be located in the first and second display areas DA1 and DA2, but may selectively not be located in a portion of the first display area DA1. The second resistance sensing line RSL2 may extend from an upper side to a lower side of the touch sensor area TSA. For example, the second resistance sensing line RSL2 may be located on a different layer from the sensing electrodes RE and overlap the sensing electrodes RE. As another example, the second resistance sensing line RSL2 may be located on the same layer as the sensing electrodes RE and may pass between the sensing electrodes RE adjacent to each other in the X-axis direction. The second resistance sensing line RSL2 may be electrically connected to the first touch pad portion TP1 through the driving line TL or a separate signal line.

In FIG. 6, the resistance of the first and second resistance sensing lines RSL1 and RSL2 may change due to physical changes or environmental changes. A resistance change rate according to environmental changes such as temperature changes may be equally applied to the first and second resistance sensing lines RSL1 and RSL2. A resistance change rate according to bending, folding, or rolling of the display panel 100 may be differently applied to the first and second resistance sensing lines RSL1 and RSL2. For example, because the first resistance sensing line RSL1 extends in the X-axis direction and the second resistance sensing line RSL2 extends in the Y-axis direction, the first resistance sensing line RSL1 may be rolled along a rolling axis and the second resistance sensing line RSL2 may not be rolled, when the display panel 100 is rolled based on the rolling axis in the Y-axis direction. Accordingly, the resistance change rate of the first resistance sensing line RSL1 may be greater than the resistance change rate of the second resistance sensing line RSL2. The touch driver 520 may sense an area in the display panel 100 where bending, folding, or rolling has occurred by comparing the resistance change rates of the first and second resistance sensing lines RSL1 and RSL2.

Figure 7:
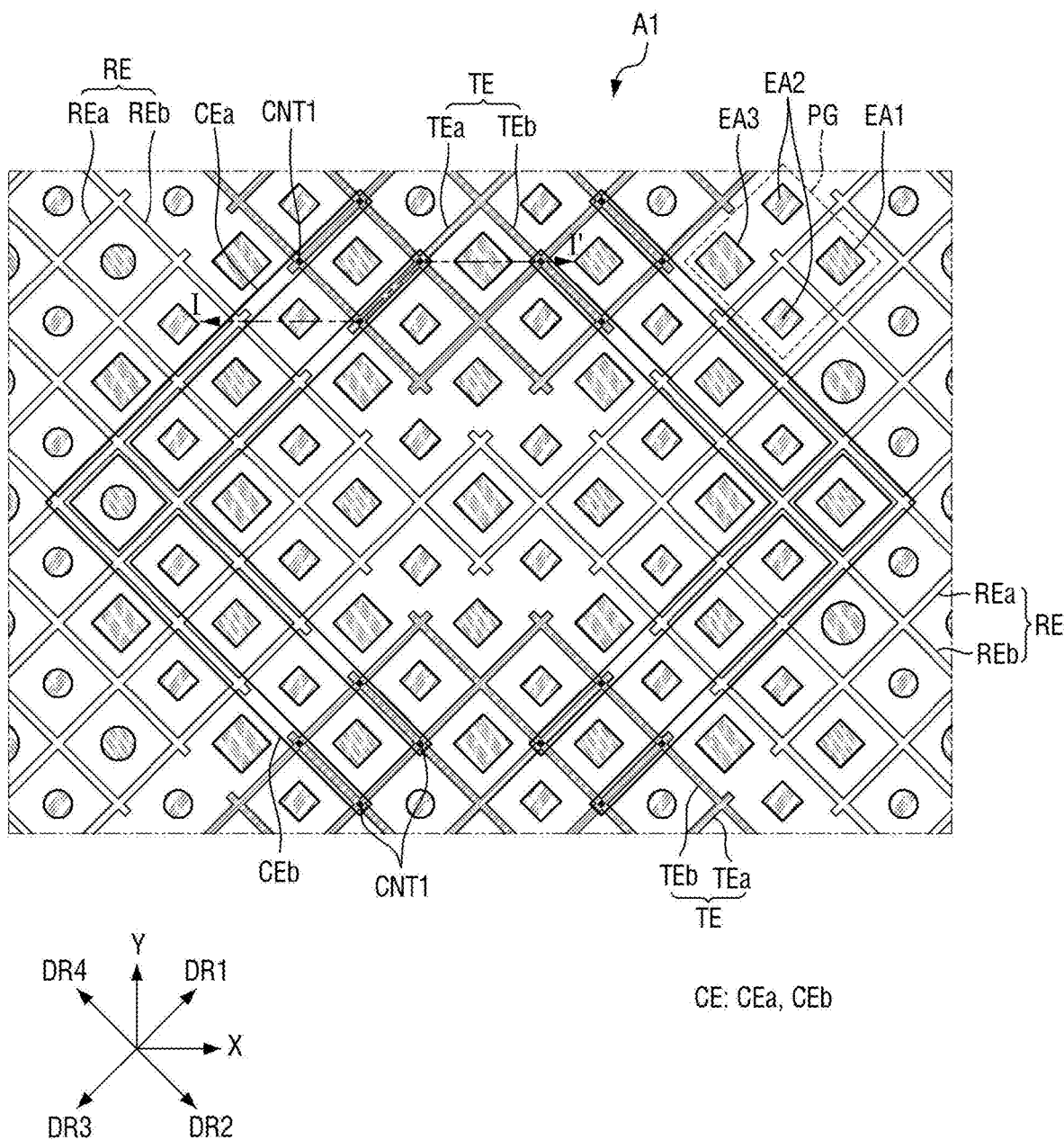
FIG. 7 is an enlarged view of the area A1 of FIG. 5.

FIG. 7 is an enlarged view of the area A1 of FIG. 5.

Referring to FIG. 7, the plurality of driving electrodes TE and the plurality of sensing electrodes RE may be located on the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through bridge electrodes CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portion. For example, the connection portion of the sensing electrodes RE may be located within the shortest distance between the driving electrodes TE adjacent to each other.

A plurality of bridge electrodes CE may be located on a different layer from the driving electrodes TE and the detecting electrodes RE. The bridge electrode CE may include a first portion CEa and a second portion CEb. For example, the first portion CEa of the bridge electrode CE may be connected to the driving electrode TE located on one side through a first contact hole CNT1 to extend in the third direction DR3. The second portion CEb of the bridge electrode CE may be bent from the first portion CEa in an area overlapping the sensing electrode RE to extend in the second direction DR2, and may be connected to the driving electrode TE located on the other side through the first contact hole CNT1. Hereinafter, the first direction DR1 may refer to a direction between the X-axis direction and the Y-axis direction, the second direction DR2 may refer to a direction between a direction opposite to the Y-axis direction and the X-axis direction, the third direction DR3 may refer to a direction opposite to the first direction DR1, and the fourth direction DR4 may refer to a direction opposite to the second direction DR2. Accordingly, each of the plurality of bridge electrodes CE may electrically connect the driving electrodes TE adjacent to each other in the Y-axis direction.

For example, the driving electrodes TE and the sensing electrodes RE may be formed in a mesh structure or a net structure in a plan view. The driving electrodes TE and the sensing electrodes RE may surround each of first to third light emitting areas EA1, EA2, and EA3 of a pixel group PG in a plan view. Therefore, the driving electrodes TE and the sensing electrodes RE may not overlap the first to third light emitting areas EA1, EA2, and EA3. The bridge electrodes CE may also not overlap the first to third light emitting areas EA1, EA2, and EA3. Therefore, the display device 10 may prevent or reduce instances of luminance of light emitted from the first to third light emitting areas EA1, EA2, and EA3 being reduced by the touch sensing unit TSU.

Each of the driving electrodes TE may include a first portion TEa extending in the first direction DR1 and a second portion TEb extending in the second direction DR2. Each of the sensing electrodes RE may include a first portion REa extending in the first direction DR1 and a second portion REb extending in the second direction DR2.

The plurality of pixels may include first to third pixels, and each of the first to third pixels may include the first to third light emitting areas EA1, EA2, and EA3, respectively. For example, the first light emitting area EA1 may emit light of a first color or red light, the second light emitting area EA2 may emit light of a second color or green light, and the third light emitting area EA3 may emit light of a third color or blue light, but the present disclosure is not limited thereto.

One pixel group PG may express a white grayscale by including one first light emitting area EA1, two second light emitting areas EA2, and one third light emitting area EA3, but the configuration of the pixel group PG is not limited thereto. The white grayscale may be expressed by a combination of light emitted from one first light emitting area EA1, light emitted from the two second light emitting areas EA2, and light emitted from one third light emitting area EA3.

Areas of the first to third light emitting areas EA1, EA2, and EA3 may be different from each other. For example, the area of the third light emitting area EA3 may be greater than the area of the first light emitting area EA1, and the area of the first light emitting area EA1 may be greater than the area of the second light emitting area EA2, but is not limited thereto. As another example, the areas of the first to third light emitting areas EA1, EA2, and EA3 may be the same.

Figure 8:
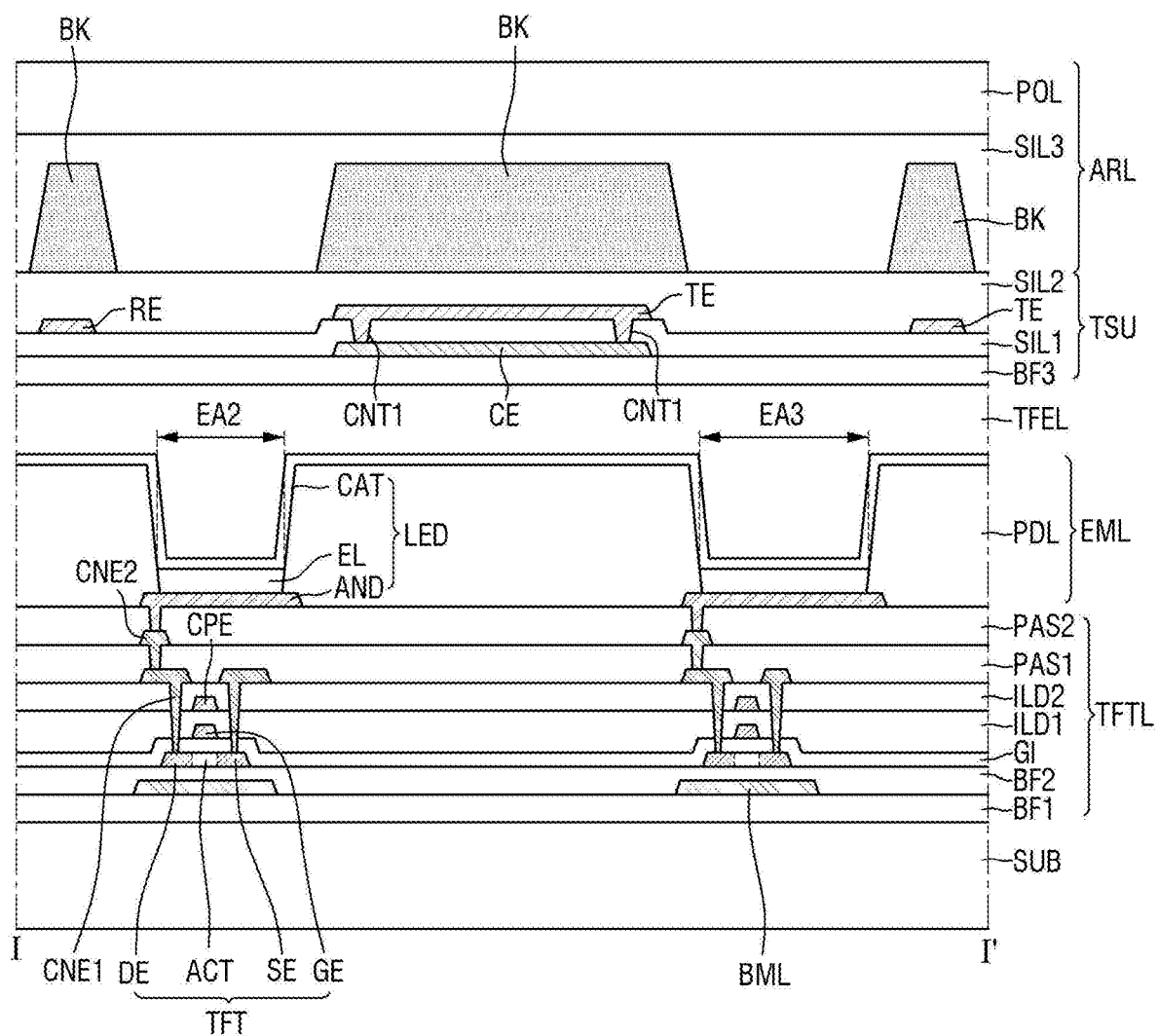
FIG. 8 is a cross-sectional view taken along the line I-I' of FIG. 7.

FIG. 8 is a cross-sectional view taken along the line I-I' of FIG. 7.

Referring to FIG. 8, the display panel 100 may include a display unit DU, a touch sensing unit TSU, and an antireflection layer ARL. The display unit DU may include a substrate SUB, a transistor layer TFTL, a light emitting element layer EML, and an encapsulation layer TFEL.

The substrate SUB may be a base substrate or a base member. The substrate SUB may be a flexible substrate that may be bent, folded, rolled, or the like. For example, the substrate SUB may include a polymer resin such as polyimide PI, but is not limited thereto. As another example, the substrate SUB may include a glass material or a metal material.

The transistor layer TFTL may include a first buffer layer BF1, a light blocking layer BML, a second buffer layer BF2, a transistor TFT, a gate insulating layer GI, a first interlayer insulating layer ILD1, a capacitor electrode CPE, a second interlayer insulating layer ILD2, a first connection electrode CNE1, a first passivation layer PAS1, a second connection electrode CNE2, and a second passivation layer PAS2.

The first buffer layer BF1 may be located on the substrate SUB. The first buffer layer BF1 may include an inorganic film capable of preventing or reducing permeation of contaminants such as air or moisture. For example, the first buffer layer BF1 may include a plurality of inorganic films alternately stacked.

The light blocking layer BML may be located on the first buffer layer BF1. For example, the light blocking layer BML may be formed as a single layer or a multi-layer made of any one of molybdenum (Mo), aluminum (Al), chromium (Cr), gold (Au), titanium (Ti), nickel (Ni), neodymium (Nd), and copper (Cu), or an alloy thereof. As another example, the light blocking layer BML may be an organic film including black pigment.

The second buffer layer BF2 may be located on the first buffer layer BF1 and the light blocking layer BML. The second buffer layer BF2 may include an inorganic film capable of preventing or reducing permeation of contaminants such as air or moisture. For example, the second buffer layer BF2 may include a plurality of inorganic films alternately stacked.

The transistor TFT may be located on the second buffer layer BF2, and may constitute a pixel circuit of each of the plurality of pixels. For example, the transistor TFT may be a switching element that constitutes the pixel circuit. The transistor TFT may include a semiconductor region ACT, a source electrode SE, a drain electrode DE, and a gate electrode GE.

The semiconductor region ACT, the source electrode SE, and the drain electrode DE may be located on the second buffer layer BF2. The semiconductor region ACT, the source electrode SE, and the drain electrode DE may overlap the light blocking layer BML in the thickness direction. The semiconductor region ACT may overlap the gate electrode GE in the thickness direction, and may be insulated from the gate electrode GE by the gate insulating layer GI. The source electrode SE and the drain electrode DE may be provided by making a material of the semiconductor region ACT into a conductor.

The gate electrode GE may be located on the gate insulating layer GI. The gate electrode GE may overlap the semiconductor region ACT with the gate insulating layer GI interposed therebetween.

The gate insulating layer GI may be located on the semiconductor region ACT, the source electrode SE, and the drain electrode DE. For example, the gate insulating layer GI may be located on the semiconductor region ACT, the source electrode SE, the drain electrode DE, and the second buffer layer BF2, and may insulate the semiconductor region ACT and the gate electrode GE from each other. The gate insulating layer GI may include a contact hole through which the first connection electrode CNE1 penetrates.

The first interlayer insulating layer ILD1 may be located on the gate electrode GE and the gate insulating layer GI. The first interlayer insulating layer ILD1 may insulate the gate electrode GE and the capacitor electrode CPE from each other. The first interlayer insulating layer ILD1 may include a contact hole through which the first connection electrode CNE1 penetrates.

The capacitor electrode CPE may be located on the first interlayer insulating layer ILD1. The capacitor electrode CPE may overlap the gate electrode GE in the thickness direction. The capacitor electrode CPE and the gate electrode GE may form a capacitance.

The second interlayer insulating layer ILD2 may be located on the capacitor electrode CPE and the first interlayer insulating layer ILD1. The second interlayer insulating layer ILD2 may insulate the capacitor electrode CPE and the first connection electrode CNE1 from each other. The second interlayer insulating layer ILD2 may include a contact hole through which the first connection electrode CNE1 penetrates.

The first connection electrode CNE1 may be located on the second interlayer insulating layer ILD2. The first connection electrode CNE1 may electrically connect the drain electrode DE of the transistor TFT and the second connection electrode CNE2 to each other. The first connection electrode CNE1 may be inserted into the contact holes formed in the second interlayer insulating layer ILD2, the first interlayer insulating layer ILD1, and the gate insulating layer GI and be in contact with the drain electrode DE of the transistor TFT.

The first passivation layer PAS1 may be located on the first connection electrode CNE1 and the second interlayer insulating layer ILD2. The first passivation layer PAS1 may insulate the first and second connection electrodes CNE1 and CNE2 from each other. The first passivation layer PAS1 may protect the transistor TFT. The first passivation layer PAS1 may include a contact hole through which the second connection electrode CNE2 penetrates.

The second connection electrode CNE2 may be located on the first passivation layer PAS1. The second connection electrode CNE2 may electrically connect the first connection electrode CNE1 and a pixel electrode AND of a light emitting element LED to each other. The second connection electrode CNE2 may be inserted into the contact hole formed in the first passivation layer PAS1 and be in contact with the first connection electrode CNE1.

The second passivation layer PAS2 may be located on the second connection electrode CNE2 and the first passivation layer PAS1. The second passivation layer PAS2 may insulate the second connection electrode CNE2 and the pixel electrode AND from each other. The second passivation layer PAS2 may include a contact hole through which the pixel electrode AND of the light emitting element LED penetrates.

The light emitting element layer EML may be located on the transistor layer TFTL. The light emitting element layer EML may include a light emitting element LED and a pixel defining film PDL. The light emitting element LED may include a pixel electrode AND, a light emitting layer EL, and a common electrode CAT.

The pixel electrode AND may be located on the second passivation layer PAS2. The pixel electrode AND may overlap one of the first to third light emitting areas EA1, EA2, and EA3 defined by the pixel defining film PDL. The pixel electrode AND may be electrically connected to the drain electrode DE of the transistor TFT through the first and second connection electrodes CNE1 and CNE2.

The light emitting layer EL may be located on the pixel electrode AND. For example, the light emitting layer EL may be an organic light emitting layer made of an organic material, but is not limited thereto. In the case in which the light emitting layer EL corresponds to the organic light emitting layer, when the transistor TFT applies a voltage (e.g., a set or predetermined voltage) to the pixel electrode AND of the light emitting element LED and the common electrode CAT receives a common voltage or a cathode voltage, holes move to the light emitting layer EL through a hole transporting layer and electrons move to the light emitting layer EL through an electron transporting layer, and as a result, the holes and the electrons may combine with each other in the light emitting layer EL to emit light.

The common electrode CAT may be located on the light emitting layer EL. For example, the common electrode CAT may be implemented in the form of an electrode common to all pixels without being divided for each of the plurality of pixels. The common electrode CAT may be located on the light emitting layer EL in the first to third light emitting areas EA1, EA2, and EA3, and may be located on the pixel defining film PDL in an area excluding the first to third light emitting areas EA1, EA2, and EA3.

The common electrode CAT may receive a common voltage or a low potential voltage. In the case in which the pixel electrode AND receives a voltage corresponding to the data voltage and the common electrode CAT receives the low potential voltage, as a potential difference is formed between the pixel electrode AND and the common electrode CAT, the light emitting layer EL may emit light.

The pixel defining film PDL may define the first to third light emitting areas EA1, EA2, and EA3. The pixel defining film PDL may separate and insulate the pixel electrodes AND of the plurality of light emitting elements LED from each other. The pixel defining film PDL may include a light absorbing material. The pixel defining film PDL may prevent or reduce light reflection.

The encapsulation layer TFEL may be located on the common electrode CAT to cover the plurality of light emitting elements LED. The encapsulation layer TFEL may include at least one inorganic film to prevent or reduce instances of contaminants such as oxygen or moisture permeating into the light emitting element layer EML. The encapsulation layer TFEL may include at least one organic film to protect the light emitting element layer EML from foreign substances such as dust.

The touch sensing unit TSU may be located on the encapsulation layer TFEL. The touch sensing unit TSU may include a third buffer layer BF3, a bridge electrode CE, a first insulating layer SIL1, a driving electrode TE, a sensing electrode RE, and a second insulating layer SIL2.

The third buffer layer BF3 may be located on the encapsulation layer TFEL. The third buffer layer BF3 may have insulation and optical functions. The third buffer layer BF3 may include an inorganic film capable of preventing or reducing permeation of contaminants such as air or moisture.

The bridge electrode CE may be located on the third buffer layer BF3. The bridge electrode CE may be located on a different layer from the driving electrode TE and the sensing electrode RE, and may electrically connect the driving electrodes TE adjacent to each other in the Y-axis direction.

The first insulating layer SIL1 may be located on the bridge electrode CE and the third buffer layer BF3. The first insulating layer SIL1 may have insulation and optical functions. For example, the first insulating layer SIL1 may be an inorganic film including at least one of a silicon nitride layer, a silicon oxynitride layer, a silicon oxide layer, a titanium oxide layer, or an aluminum oxide layer. As another example, the first insulating layer SIL1 may include an organic film.

The driving electrode TE and the sensing electrode RE may be located on the first insulating layer SIL1. Each of the driving electrode TE and the sensing electrode RE may not overlap the first to third light emitting areas EA1, EA2, and EA3. Each of the driving electrode TE and the sensing electrode RE may be formed as a single layer made of molybdenum (Mo), titanium (Ti), copper (Cu), aluminum (Al), or indium tin oxide (ITO), or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The second insulating layer SIL2 may be located on the driving electrode TE, the sensing electrode RE, and the first insulating layer SIL1. The second insulating layer SIL2 may have insulation and optical functions. The second insulating layer SIL2 may be formed of the material illustrated in the first insulating layer SIL1.

The antireflection layer ARL may be located on the touch sensing unit TSU. The antireflection layer ARL may include a light blocking member BK, a third insulating layer SIL3, and an optical member POL.

The light blocking member BK may be located on the second insulating layer SIL2. The light blocking member BK may overlap the driving electrode TE and the sensing electrode RE, thereby preventing or reducing light reflection by the driving electrode TE and the sensing electrode RE. The light blocking member BK may include a light absorbing material. For example, the light blocking member BK may include an inorganic black pigment, an organic black pigment, or an organic blue pigment. The light blocking member BK may prevent or reduce instances of visible light permeating and mixing colors between the first to third light emitting areas EA1, EA2, and EA3, thereby relatively improving a color reproduction rate of the display device 10.

The third insulating layer SIL3 may be located on the light blocking member BK and the second insulating layer SIL2. The third insulating layer SIL3 may have insulation and optical functions. The third insulating layer SIL3 may be formed of the material illustrated in the first insulating layer SIL1.

The optical member POL may be located on the third insulating layer SIL3. The optical member POL may be attached onto the touch sensing unit TSU by using an optically clear adhesive (OCA) film or an optically clear resin (OCR). For example, the optical member POL may include a linear polarizer and a phase retardation film, and the phase retardation film may be a λ/4 plate (quarter-wave plate). The phase retardation film and the linear polarizer may be sequentially stacked on the third insulating layer SIL3. The optical member POL may prevent or reduce color distortion due to external light reflection by reducing reflected light by external light.

Figure 9:
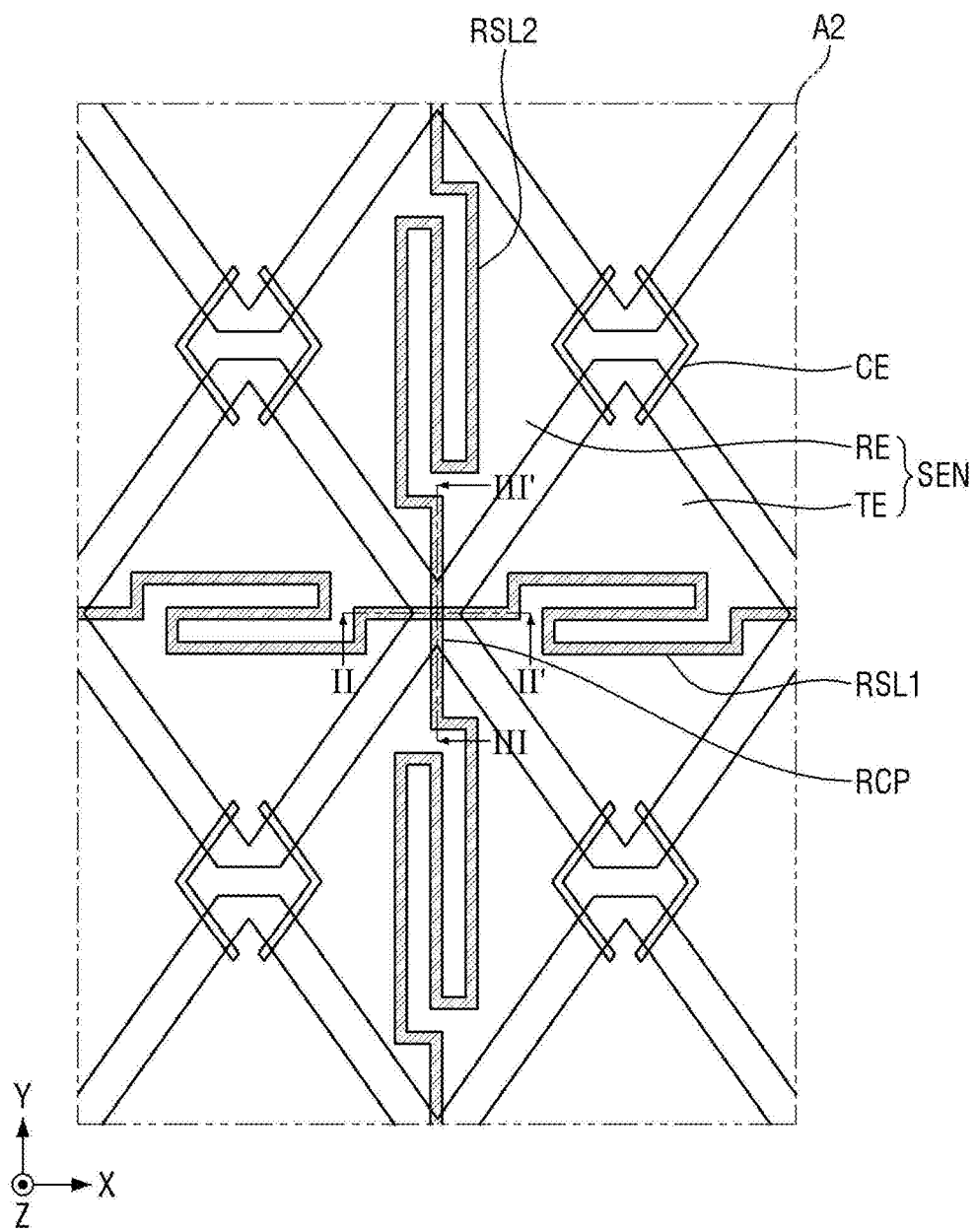
FIG. 9 is an enlarged view illustrating an example of the area A2 of FIG. 5.
Figure 10:
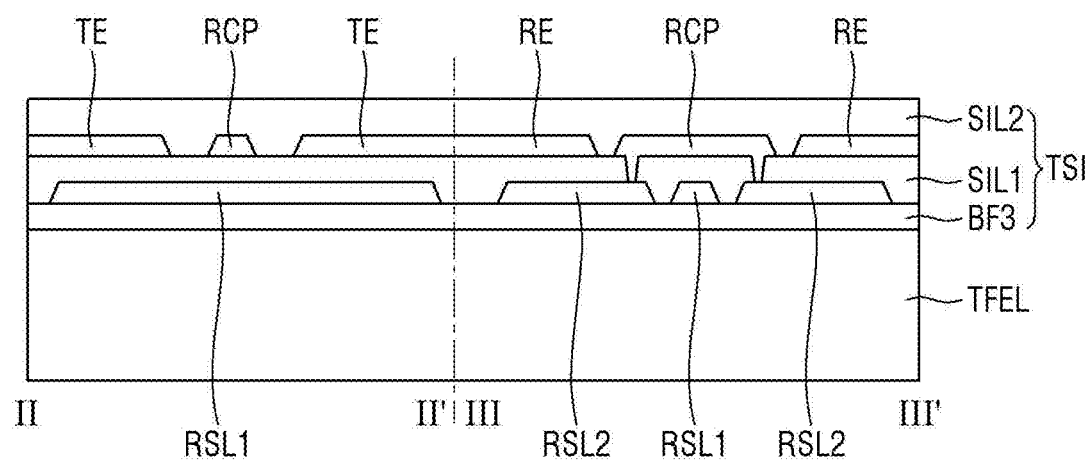
FIG. 10 is a cross-sectional view taken along the lines II-II' and III-III' of FIG. 9.

FIG. 9 is an enlarged view illustrating an example of the area A2 of FIG. 5, and FIG. 10 is a cross-sectional view taken along the lines II-II' and III-III' of FIG. 9.

Referring to FIGS. 9 and 10, the first resistance sensing line RSL1 may extend in the X-axis direction and overlap the driving electrode TE. The first resistance sensing line RSL1 may include a resistance sensing pattern that is bent multiple times in an area overlapping one driving electrode TE. The resistance sensing pattern of the first resistance sensing line RSL1 may include a plurality of portions extending in the X-axis direction and adjacent to each other in the Y-axis direction. The driving electrode TE may be located on the first resistance sensing line RSL1. The first resistance sensing line RSL1 may be located on the third buffer layer BF3, and the driving electrode TE may be located on the first insulating layer SIL1.

The second resistance sensing line RSL2 may extend in the Y-axis direction and overlap the sensing electrode RE. The second resistance sensing line RSL2 may include a resistance sensing pattern that is bent multiple times in an area overlapping one sensing electrode RE. The resistance sensing pattern of the second resistance sensing line RSL2 may include a plurality of portions extending in the Y-axis direction and adjacent to each other in the X-axis direction. The driving electrode TE and the sensing electrode RE may be located on the same layer, and the first and second resistance sensing lines RSL1 and RSL2 may be located on the same layer. The second resistance sensing line RSL2 may be located on the third buffer layer BF3, and the sensing electrode RE may be located on the first insulating layer SIL1.

The second resistance sensing line RSL2 may include a line connection portion RCP. The second resistance sensing lines RSL2 may be electrically connected to each other through the line connection portion RCP that overlaps the first resistance sensing line RSL1. The first resistance sensing line RSL1 may be integrally formed integrally on the third buffer layer BF3. The second resistance sensing lines RSL2 may be separated from each other in the area where the first resistance sensing line RSL1 passes and may be electrically connected through the line connection portion RCP. The line connection portion RCP may be located on the first and second resistance sensing lines RSL1 and RSL2 and may be located on the same layer as the driving electrode TE and the sensing electrode RE.

As another example, the first and second resistance sensing lines RSL1 and RSL2 may be located on the driving electrode TE, the sensing electrode RE, and the line connection portion RCP.

Therefore, the touch sensing unit TSU may include the driving electrode TE, the sensing electrode RE, and the first and second resistance sensing lines RSL1 and RSL2 formed of two metal layers, and the touch driver 520 may sense an area in the display panel 100 where bending, folding, or rolling has occurred by comparing resistance change rates of the first and second resistance sensing lines RSL1 and RSL2. The display device 10 may sense the area in the display panel 100 where bending, folding, or rolling has occurred without including a separate sensor, switch, or metal layer.

Figure 11:
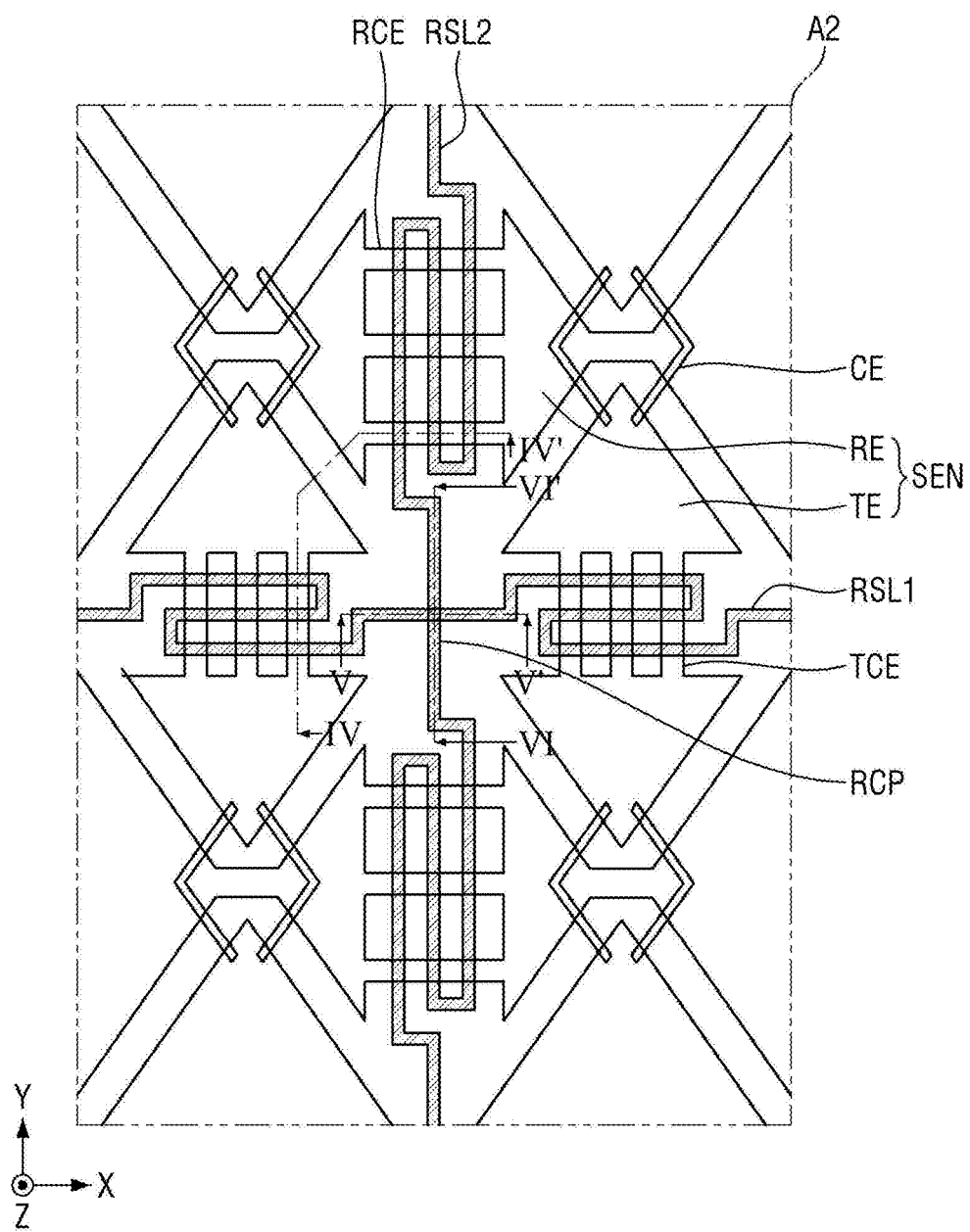
FIG. 11 is an enlarged view illustrating another example of the area A2 of FIG. 5.
Figure 12:
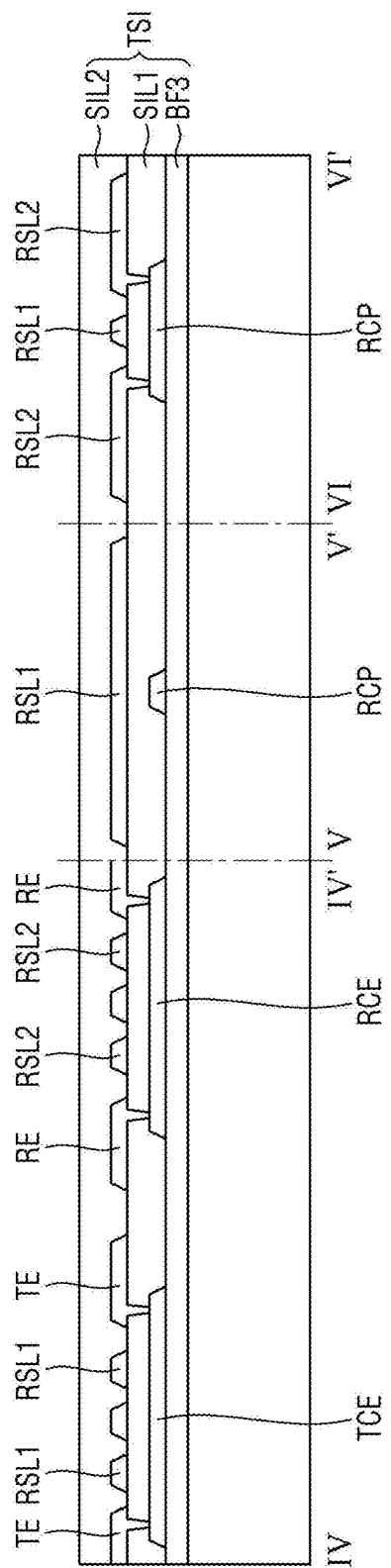
FIG. 12 is a cross-sectional view taken along the lines IV-IV', V-V', and VI-VI' of FIG. 11.

FIG. 11 is an enlarged view illustrating another example of the area A2 of FIG. 5, and FIG. 12 is a cross-sectional view taken along the lines IV-IV', V-V', and VI-VI' of FIG. 11.

Referring to FIGS. 11 and 12, the first resistance sensing line RSL1 may extend in the X-axis direction. The first resistance sensing line RSL1 may be located on the same layer as the driving electrodes TE and may pass between the driving electrodes TE adjacent to each other in the Y-axis direction. The driving electrodes TE adjacent to each other in the Y-axis direction may be electrically connected to each other through a first electrode connection portion TCE. The first resistance sensing line RSL1 may overlap the first electrode connection portion TCE. The first resistance sensing line RSL1 may include a resistance sensing pattern that is bent multiple times in an area overlapping the first electrode connection portion TCE. The resistance sensing pattern of the first resistance sensing line RSL1 may include a plurality of portions extending in the X-axis direction and adjacent to each other in the Y-axis direction. The first electrode connection portion TCE may be located on the third buffer layer BF3, and the driving electrode TE and the first resistance sensing line RSL1 may be located on the first insulating layer SIL1.

The second resistance sensing line RSL2 may extend in the Y-axis direction. The second resistance sensing line RSL2 may be located on the same layer as the sensing electrodes RE and may pass between the sensing electrodes RE adjacent to each other in the X-axis direction. The sensing electrodes RE adjacent to each other in the X-axis direction may be electrically connected through a second electrode connection portion RCE. The second resistance sensing line RSL2 may overlap the second electrode connection portion RCE. The second resistance sensing line RSL2 may include a resistance sensing pattern that is bent multiple times in an area overlapping the second electrode connection portion RCE. The resistance sensing pattern of the second resistance sensing line RSL2 may include a plurality of portions extending in the Y-axis direction and adjacent to each other in the X-axis direction. The second electrode connection portion RCE may be located on the third buffer layer BF3, and the sensing electrode RE and the second resistance sensing line RSL2 may be located on the first insulating layer SIL1.

The second resistance sensing line RSL2 may include a line connection portion RCP. The second resistance sensing lines RSL2 may be electrically connected to each other through the line connection portion RCP that overlaps the first resistance sensing line RSL1. The first resistance sensing line RSL1 may be integrally formed integrally on the first insulating layer SIL1. The second resistance sensing lines RSL2 may be separated from each other in the area where the first resistance sensing line RSL1 passes and may be electrically connected through the line connection portion RCP. The line connection portion RCP may be located below the first and second resistance sensing lines RSL1 and RSL2. Therefore, the driving electrode TE, the sensing electrode RE, and the first and second resistance sensing lines RSL1 and RSL2 may be located on the same layer, and the first and second electrode connection portions TCE and RCE and line connection portion RCP may be located on the same layer.

As another example, the first and second electrode connection portions TCE and RCE and the line connection portion RCP may be located on the driving electrode TE, the sensing electrode RE, and the first and second resistance sensing lines RSL1 and RSL2.

Therefore, the touch sensing unit TSU may include the driving electrode TE, the sensing electrode RE, and the first and second resistance sensing lines RSL1 and RSL2 formed of two metal layers, and the touch driver 520 may sense an area in the display panel 100 where bending, folding, or rolling has occurred by comparing resistance change rates of the first and second resistance sensing lines RSL1 and RSL2. The display device 10 may sense the area in the display panel 100 where bending, folding, or rolling has occurred without including a separate sensor, switch, or metal layer.

Figure 13:
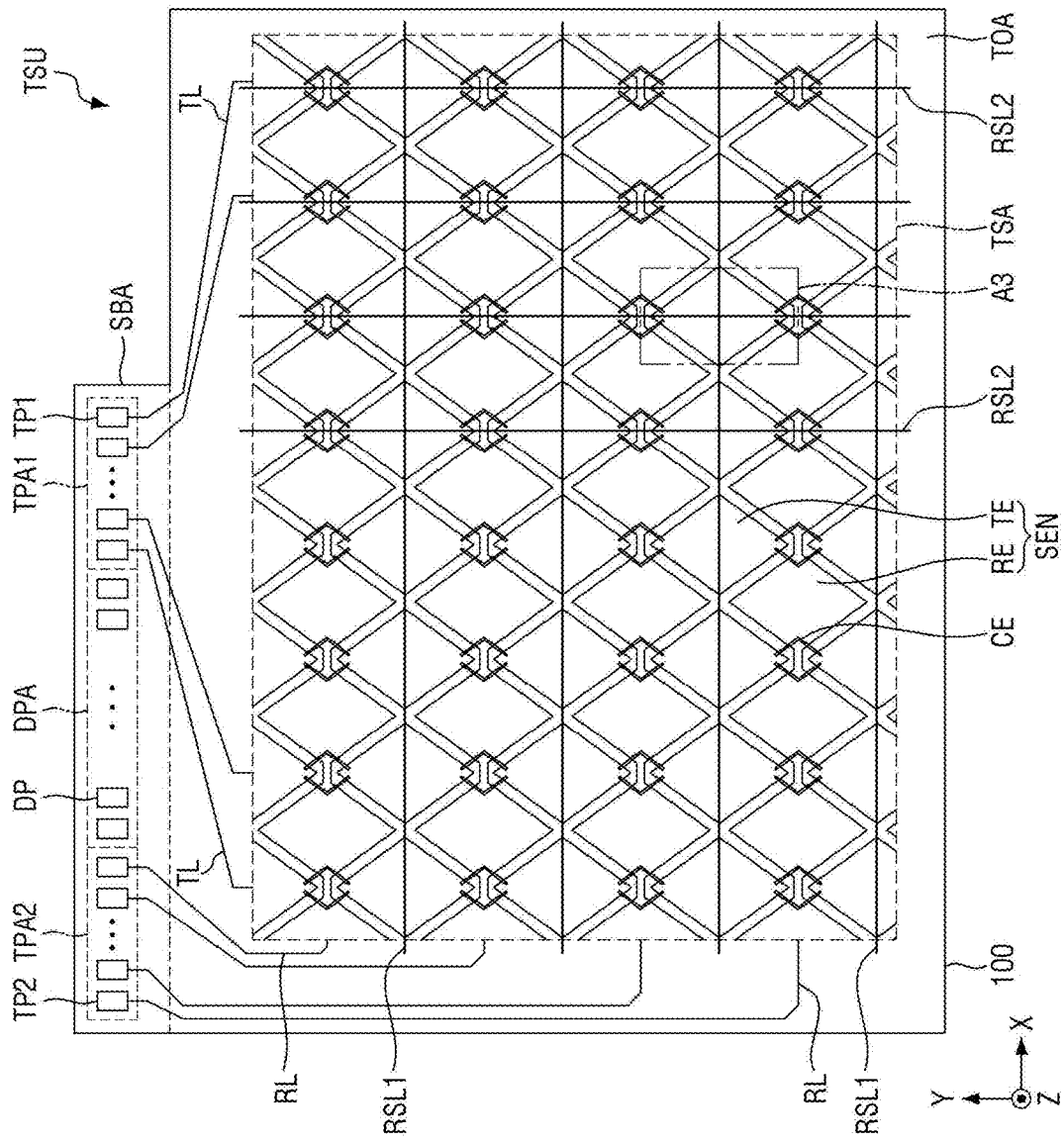
FIG. 13 is a plan view illustrating a touch sensing unit of a display device according to some embodiments.

FIG. 13 is a plan view illustrating a touch sensing unit of a display device according to some embodiments. A touch sensing unit of FIG. 13 is different from the touch sensing unit of FIG. 5 in that the first and second resistance sensing lines RSL1 and RSL2 have different configurations, and configurations that are the same as those described above will be briefly described or omitted.

Referring to FIG. 13, a plurality of first resistance sensing lines RSL1 may extend in the X-axis direction and be spaced apart from each other in the Y-axis direction. The first resistance sensing line RSL1 may be located in the first and second display areas DA1 and DA2. The first resistance sensing line RSL1 may extend from the left side to the right side of the touch sensor area TSA. For example, the first resistance sensing line RSL1 may be located on a different layer from the driving electrodes TE and overlap the driving electrodes TE. As another example, the first resistance sensing line RSL1 may be located on the same layer as the driving electrodes TE and may pass between the driving electrodes TE adjacent to each other in the Y-axis direction. The first resistance sensing line RSL1 may be electrically connected to the second touch pad portion TP2 through the sensing line RL or a separate signal line.

A plurality of second resistance sensing lines RSL2 may extend in the Y-axis direction and be spaced apart from each other in the X-axis direction. The second resistance sensing line RSL2 may be located in the first and second display areas DA1 and DA2, but may selectively not be located in a portion of the first display area DA1. The second resistance sensing line RSL2 may extend from an upper side to a lower side of the touch sensor area TSA. For example, the second resistance sensing line RSL2 may be located on a different layer from the driving electrodes TE and overlap the driving electrodes TE. The second resistance sensing line RSL2 may be electrically connected to the first touch pad portion TP1 through the driving line TL or a separate signal line.

Figure 14:
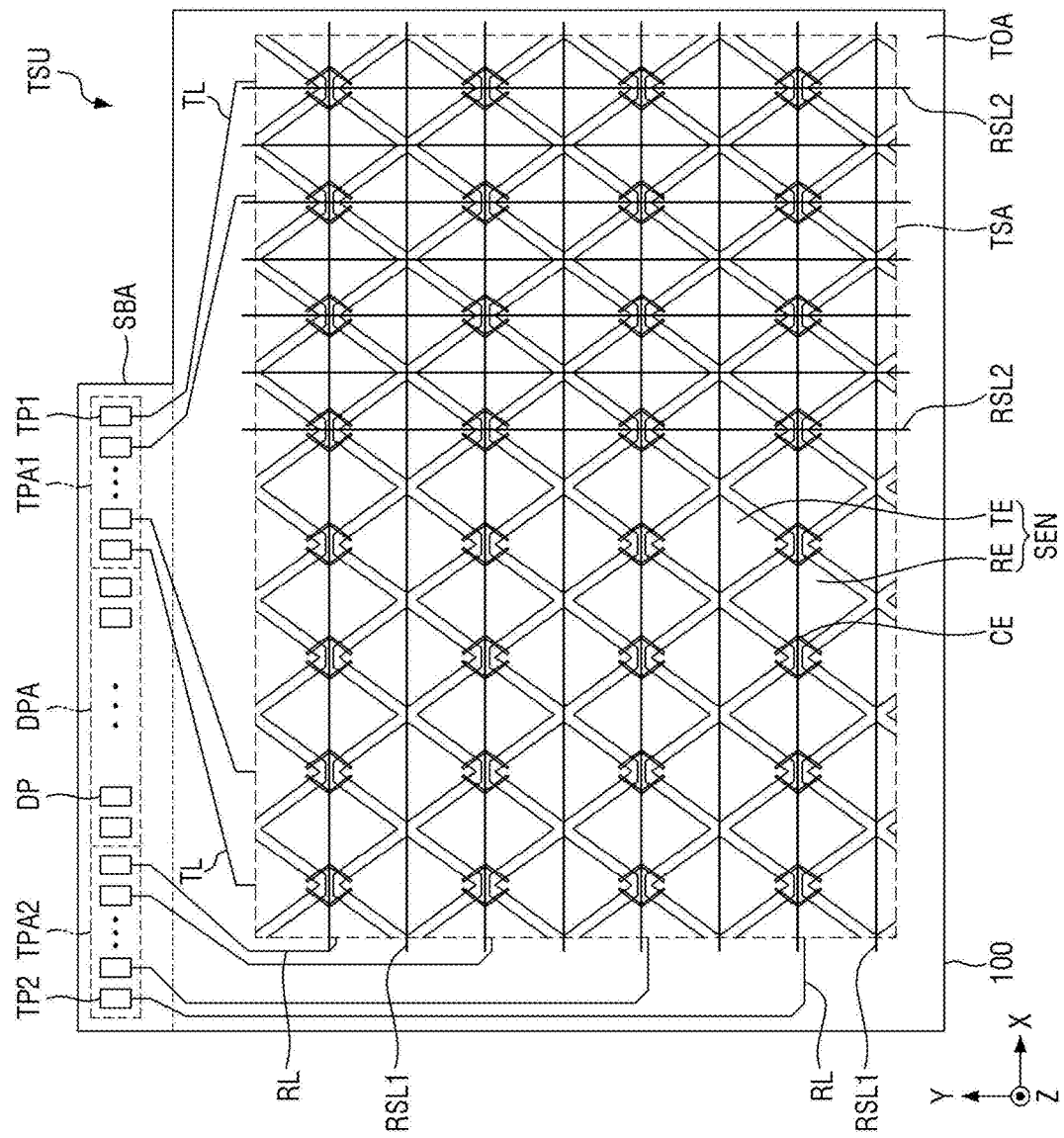
FIG. 14 is a plan view illustrating a touch sensing unit of a display device according to some embodiments.

FIG. 14 is a plan view illustrating a touch sensing unit of a display device according to some embodiments. A touch sensing unit of FIG. 14 is different from the touch sensing unit of FIG. 13 in that the first and second resistance sensing lines RSL1 and RSL2 have different configurations, and configurations that are the same as those described above will be briefly described or omitted.

Referring to FIG. 14, a plurality of first resistance sensing lines RSL1 may extend in the X-axis direction and be spaced apart from each other in the Y-axis direction. The first resistance sensing line RSL1 may be located in the first and second display areas DA1 and DA2. The first resistance sensing line RSL1 may extend from the left side to the right side of the touch sensor area TSA. For example, the first resistance sensing line RSL1 may be located on a different layer from the driving electrodes TE and the sensing electrodes RE and overlap the driving electrodes TE and the sensing electrodes RE. As another example, the first resistance sensing line RSL1 may be located on the same layer as the driving electrodes TE and may pass between the driving electrodes TE adjacent to each other in the Y-axis direction. The first resistance sensing line RSL1 may be electrically connected to the second touch pad portion TP2 through the sensing line RL or a separate signal line.

A plurality of second resistance sensing lines RSL2 may extend in the Y-axis direction and be spaced apart from each other in the X-axis direction. The second resistance sensing line RSL2 may be located in the first and second display areas DA1 and DA2, but may selectively not be located in a portion of the first display area DA1. The second resistance sensing line RSL2 may extend from an upper side to a lower side of the touch sensor area TSA. For example, the second resistance sensing line RSL2 may be located on a different layer from the driving electrodes TE and the sensing electrodes RE and overlap the driving electrodes TE and the sensing electrodes RE. The second resistance sensing line RSL2 may be electrically connected to the first touch pad portion TP1 through the driving line TL or a separate signal line.

Figure 15:
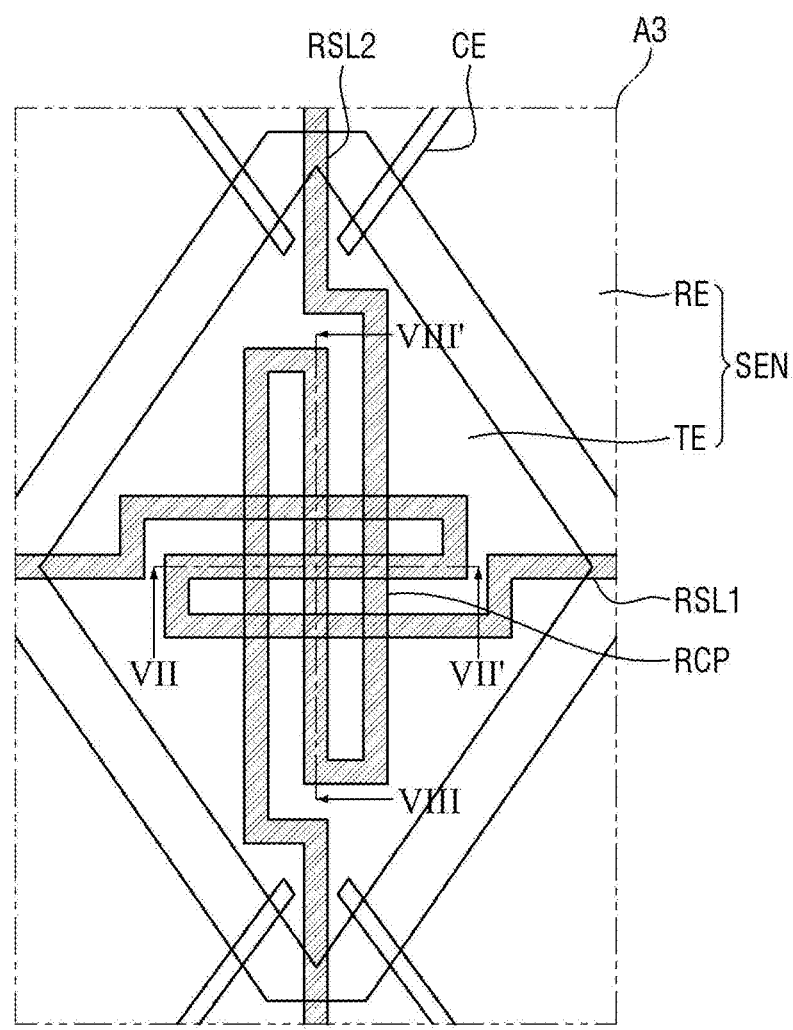
FIG. 15 is an enlarged view illustrating an example of the area A3 of FIG. 13.
Figure 16:
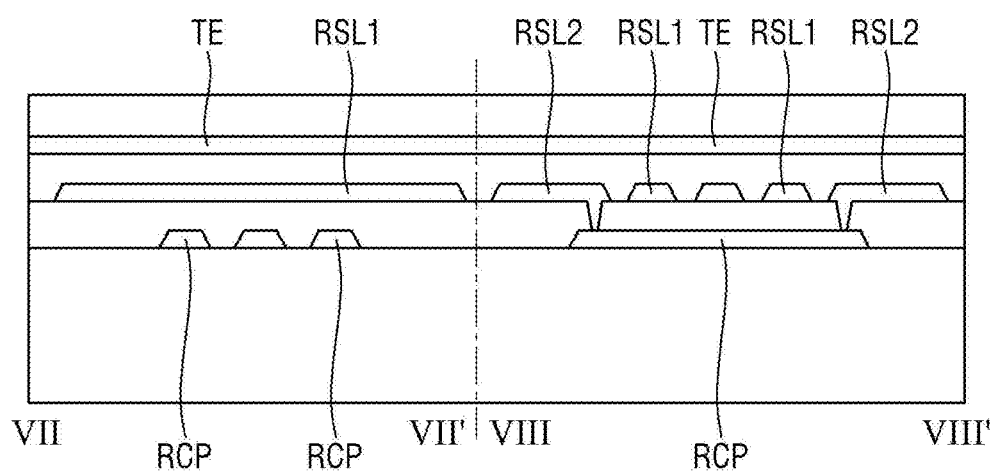
FIG. 16 is a cross-sectional view taken along the lines VII-VII' and VIII-VIII' of FIG. 15.

FIG. 15 is an enlarged view illustrating an example of the area A3 of FIG. 13, and FIG. 16 is a cross-sectional view taken along the lines VII-VII' and VIII-VIII' of FIG. 15.

Referring to FIGS. 15 and 16, the first resistance sensing line RSL1 may extend in the X-axis direction and overlap the driving electrode TE. The first resistance sensing line RSL1 may include a resistance sensing pattern that is bent multiple times in an area overlapping one driving electrode TE. The resistance sensing pattern of the first resistance sensing line RSL1 may include a plurality of portions extending in the X-axis direction and adjacent to each other in the Y-axis direction. The driving electrode TE may be located on the first resistance sensing line RSL1. The first resistance sensing line RSL1 may be located on the third buffer layer BF3, and the driving electrode TE may be located on the first insulating layer SIL1.

The second resistance sensing line RSL2 may extend in the Y-axis direction and overlap the driving electrode TE. The second resistance sensing line RSL2 may include a resistance sensing pattern that is bent multiple times in an area overlapping one driving electrode TE. The resistance sensing pattern of the second resistance sensing line RSL2 may overlap the resistance sensing pattern of the first resistance sensing line RSL1. The resistance sensing pattern of the second resistance sensing line RSL2 may include a plurality of portions extending in the Y-axis direction and adjacent to each other in the X-axis direction. The driving electrode TE and the sensing electrode RE may be located on the same layer, and the first and second resistance sensing lines RSL1 and RSL2 may be located on the same layer. The second resistance sensing line RSL2 may be located on the third buffer layer BF3.

The second resistance sensing line RSL2 may include a line connection portion RCP. The second resistance sensing lines RSL2 may be electrically connected to each other through the line connection portion RCP that overlaps the first resistance sensing line RSL1. The first resistance sensing line RSL1 may be integrally formed integrally on the third buffer layer BF3. The second resistance sensing lines RSL2 may be separated from each other in the area where the first resistance sensing line RSL1 passes and may be electrically connected through the line connection portion RCP. The line connection portion RCP may be located below the first and second resistance sensing lines RSL1 and RSL2. The line connection portion RCP may be located on the encapsulation layer TFEL.

As another example, the first and second resistance sensing lines RSL1 and RSL2 may be located on the driving electrode TE and the sensing electrode RE.

Therefore, the touch sensing unit TSU may include the driving electrode TE, the sensing electrode RE, and the first and second resistance sensing lines RSL1 and RSL2 formed of three metal layers, and the touch driver 520 may sense an area in the display panel 100 where bending, folding, or rolling has occurred by comparing resistance change rates of the first and second resistance sensing lines RSL1 and RSL2. The display device 10 may sense the area in the display panel 100 where bending, folding, or rolling has occurred without including a separate sensor, switch, or metal layer.

The configuration of the first and second resistance sensing lines RSL1 and RSL2 of FIGS. 15 and 16 may be applied to overlap the sensing electrode RE in the touch sensing unit TSU of FIG. 14.

Figure 17:
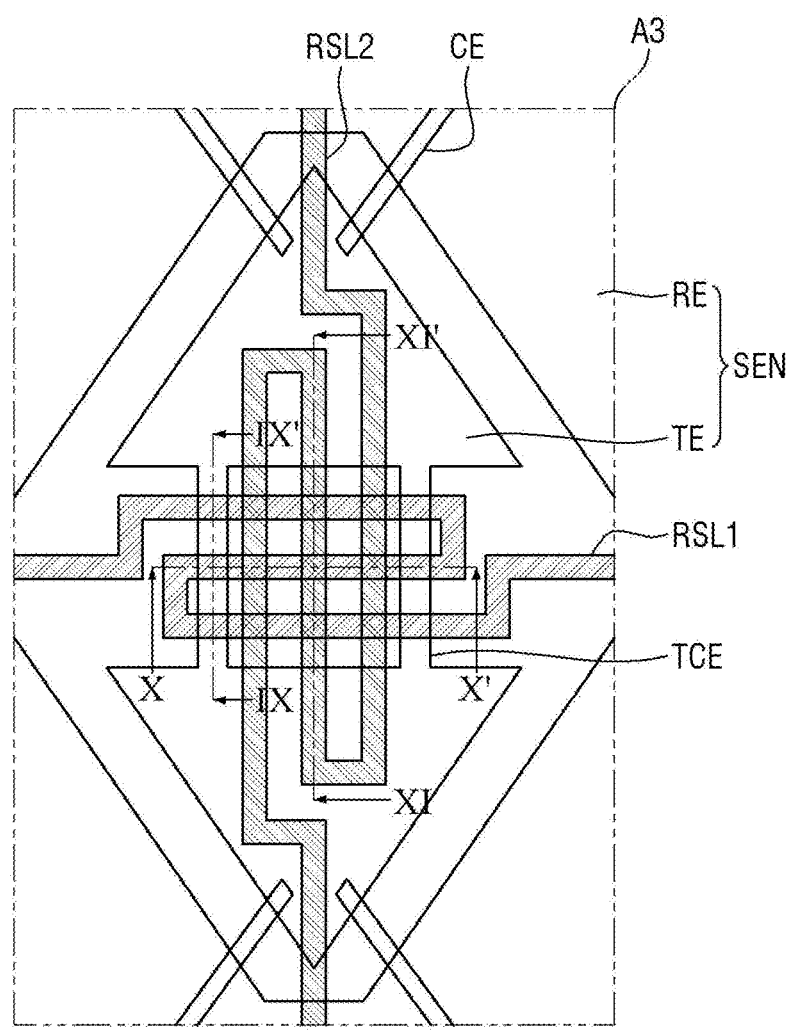
FIG. 17 is an enlarged view illustrating another example of the area A3 of FIG. 13.
Figure 18:
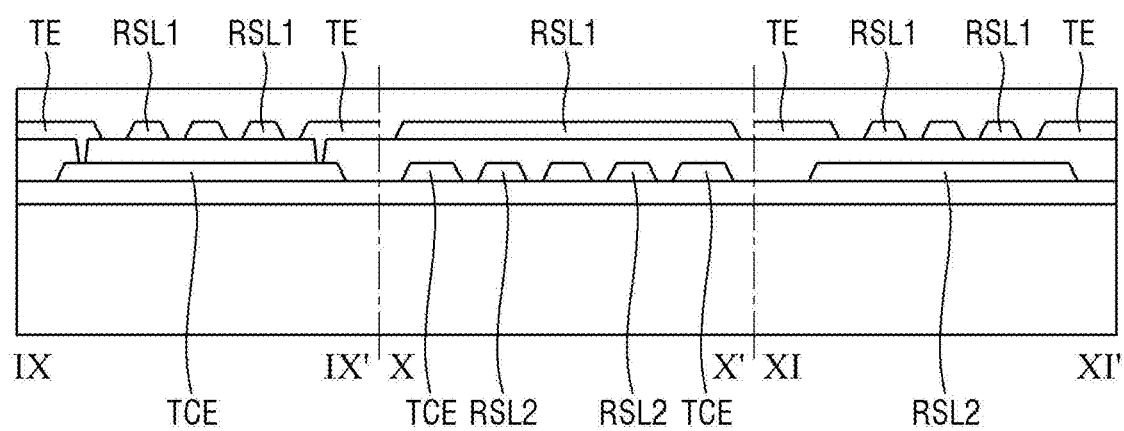
FIG. 18 is a cross-sectional view taken along the lines IX-IX', X-X', and XI-XI' of FIG. 17.

FIG. 17 is an enlarged view illustrating another example of the area A3 of FIG. 13, and FIG. 18 is a cross-sectional view taken along the lines IX-IX', X-X', and XI-XI' of FIG. 17.

Referring to FIGS. 17 and 18, the first resistance sensing line RSL1 may extend in the X-axis direction. The first resistance sensing line RSL1 may be located on the same layer as the driving electrodes TE and may pass between the driving electrodes TE adjacent to each other in the Y-axis direction. The driving electrodes TE adjacent to each other in the Y-axis direction may be electrically connected to each other through a first electrode connection portion TCE. The first resistance sensing line RSL1 may overlap the first electrode connection portion TCE. The first resistance sensing line RSL1 may include a resistance sensing pattern that is bent multiple times in an area overlapping the first electrode connection portion TCE. The resistance sensing pattern of the first resistance sensing line RSL1 may include a plurality of portions extending in the X-axis direction and adjacent to each other in the Y-axis direction. The first electrode connection portion TCE may be located on the third buffer layer BF3, and the driving electrode TE and the first resistance sensing line RSL1 may be located on the first insulating layer SIL1. The first resistance sensing line RSL1 may be integrally formed integrally on the first insulating layer SIL1.

The second resistance sensing line RSL2 may extend in the Y-axis direction. The second resistance sensing line RSL2 may be located below the driving electrode TE and the first resistance sensing line RSL1 and overlap the driving electrodes TE. The second resistance sensing line RSL2 may be located on the same layer as the first electrode connection portion TCE. The second resistance sensing line RSL2 may include a resistance sensing pattern that is bent multiple times. The resistance sensing pattern of the second resistance sensing line RSL2 may overlap the resistance sensing pattern of the first resistance sensing line RSL1. The resistance sensing pattern of the second resistance sensing line RSL2 may include a plurality of portions extending in the Y-axis direction and adjacent to each other in the X-axis direction. The second resistance sensing line RSL2 may be integrally formed integrally on the third buffer layer BF3.

As another example, the first electrode connection portion TCE and the second resistance sensing line RSL2 may be located on the driving electrode TE and the first resistance sensing line RSL1.

Therefore, the touch sensing unit TSU may include the driving electrode TE, the sensing electrode RE, and the first and second resistance sensing lines RSL1 and RSL2 formed of two metal layers, and the touch driver 520 may sense an area in the display panel 100 where bending, folding, or rolling has occurred by comparing resistance change rates of the first and second resistance sensing lines RSL1 and RSL2. The display device 10 may sense the area in the display panel 100 where bending, folding, or rolling has occurred without including a separate sensor, switch, or metal layer.

What is claimed is:

1. A display device comprising:
a first display area;
a second display area on one side of the first display area;
a display unit in the first and second display areas and including a light emitting element configured to emit light;
a plurality of driving electrodes on the display unit and electrically connected in a first direction;
a plurality of sensing electrodes on a same layer as the driving electrodes and extending in a second direction intersecting the first direction;
a first resistance sensing line extending in the second direction and overlapping at least some of the driving electrodes; and
a second resistance sensing line on a same layer as the first resistance sensing line, extending in the first direction, and overlapping at least some of the sensing electrodes.

2. The display device of claim 1, further comprising a touch driver configured to sense an area where bending, folding, or rolling of the second display area is configured to occur by comparing resistance change rates of the first and second resistance sensing lines.

3. The display device of claim 1, wherein the second resistance sensing line comprises a line connection portion overlapping the first resistance sensing line and on a same layer as the driving electrodes and the sensing electrodes.

4. The display device of claim 1, wherein the first resistance sensing line comprises a resistance sensing pattern that is bent multiple times in an area overlapping a driving electrode from among the driving electrodes, and
the second resistance sensing line comprises a resistance sensing pattern that is bent multiple times in an area overlapping a sensing electrode from among the sensing electrodes.

5. The display device of claim 1, wherein the driving electrodes and the sensing electrodes are on the first and second resistance sensing lines.

6. The display device of claim 1, further comprising a bridge electrode electrically connecting the driving electrodes adjacent to each other in the first direction,
wherein the bridge electrode and the first and second resistance sensing lines are on a same layer.

* * * * *